US010518671B2

(12) United States Patent
Mitchell et al.

(10) Patent No.: US 10,518,671 B2
(45) Date of Patent: Dec. 31, 2019

(54) CAR SEAT WITH ENERGY MANAGING FRAME

(71) Applicant: Graco Children's Products Inc., Atlanta, GA (US)

(72) Inventors: Thomas Jake Mitchell, Atlanta, GA (US); Daniel Brunick, Cumming, GA (US); Nicholas Lombardi, Atlanta, GA (US); William Conway, Marietta, GA (US)

(73) Assignee: Graco Children's Products Inc., Atlanta, GA (US)

( * ) Notice: Subject to any disclaimer, the term of this patent is extended or adjusted under 35 U.S.C. 154(b) by 49 days.

(21) Appl. No.: 15/692,053

(22) Filed: Aug. 31, 2017

(65) Prior Publication Data
US 2018/0072195 A1    Mar. 15, 2018

Related U.S. Application Data

(60) Provisional application No. 62/394,887, filed on Sep. 15, 2016.

(51) Int. Cl.
*B60N 2/28* (2006.01)

(52) U.S. Cl.
CPC ......... *B60N 2/2821* (2013.01); *B60N 2/2884* (2013.01)

(58) Field of Classification Search
CPC ...... B60N 2/2821; B60N 2/2884; B60N 2/42; B60N 2/42709
See application file for complete search history.

(56) References Cited

U.S. PATENT DOCUMENTS

| 4,145,081 | A  | * | 3/1979  | Withers ............... | B60N 2/4221 297/216.14 |
| 5,639,144 | A  | * | 6/1997  | Naujokas ............. | B60N 2/2827 297/216.11 |
| 6,471,292 | B1 | * | 10/2002 | Sundgren ........... | B60N 2/42709 297/216.13 |
| 7,360,832 | B2 | * | 4/2008  | Yokota ................ | B60N 2/4228 297/216.1 |
| 8,047,605 | B2 | * | 11/2011 | Yamazaki ........... | B60N 2/4228 297/216.1 |
| 8,348,337 | B2 | * | 1/2013  | Franck ................ | B60N 2/2809 297/216.11 |
| 8,579,369 | B2 | * | 11/2013 | Gaudreau, Jr. ...... | B60N 2/2812 297/216.11 |

(Continued)

*Primary Examiner* — Philip F Gabler
(74) *Attorney, Agent, or Firm* — Eversheds Sutherland (US) LLP

(57) ABSTRACT

A car seat may include a seat shell configured for supporting a child thereon, a base supporting the seat shell, and a support frame positioned at least partially within the seat shell and/or the base and configured to manage energy during a crash event. The support frame may include a first frame portion and a second frame portion attached to the first frame portion. The first frame portion may include a first side support and a second side support spaced apart from one another, and the second frame portion may include a first side support and a second side support spaced apart from one another. A stiffness of each of the first side support and the second side support of the second frame portion may be different than a stiffness of each of the first side support and the second side support of the first frame portion.

18 Claims, 17 Drawing Sheets

(56) References Cited

U.S. PATENT DOCUMENTS

| | | | | |
|---|---|---|---|---|
| 8,585,138 B2 * | 11/2013 | Gaudreau, Jr. | ...... | B60N 2/2812 |
| | | | | 297/216.11 |
| 8,967,663 B2 * | 3/2015 | Seki | ...... | B60N 2/4228 |
| | | | | 280/730.2 |
| 9,132,754 B2 * | 9/2015 | Mindel | ...... | B60N 2/2824 |
| 9,359,080 B2 * | 6/2016 | Joffre | ...... | B64D 11/0619 |
| 10,081,274 B2 * | 9/2018 | Frank | ...... | B60N 2/2803 |

* cited by examiner

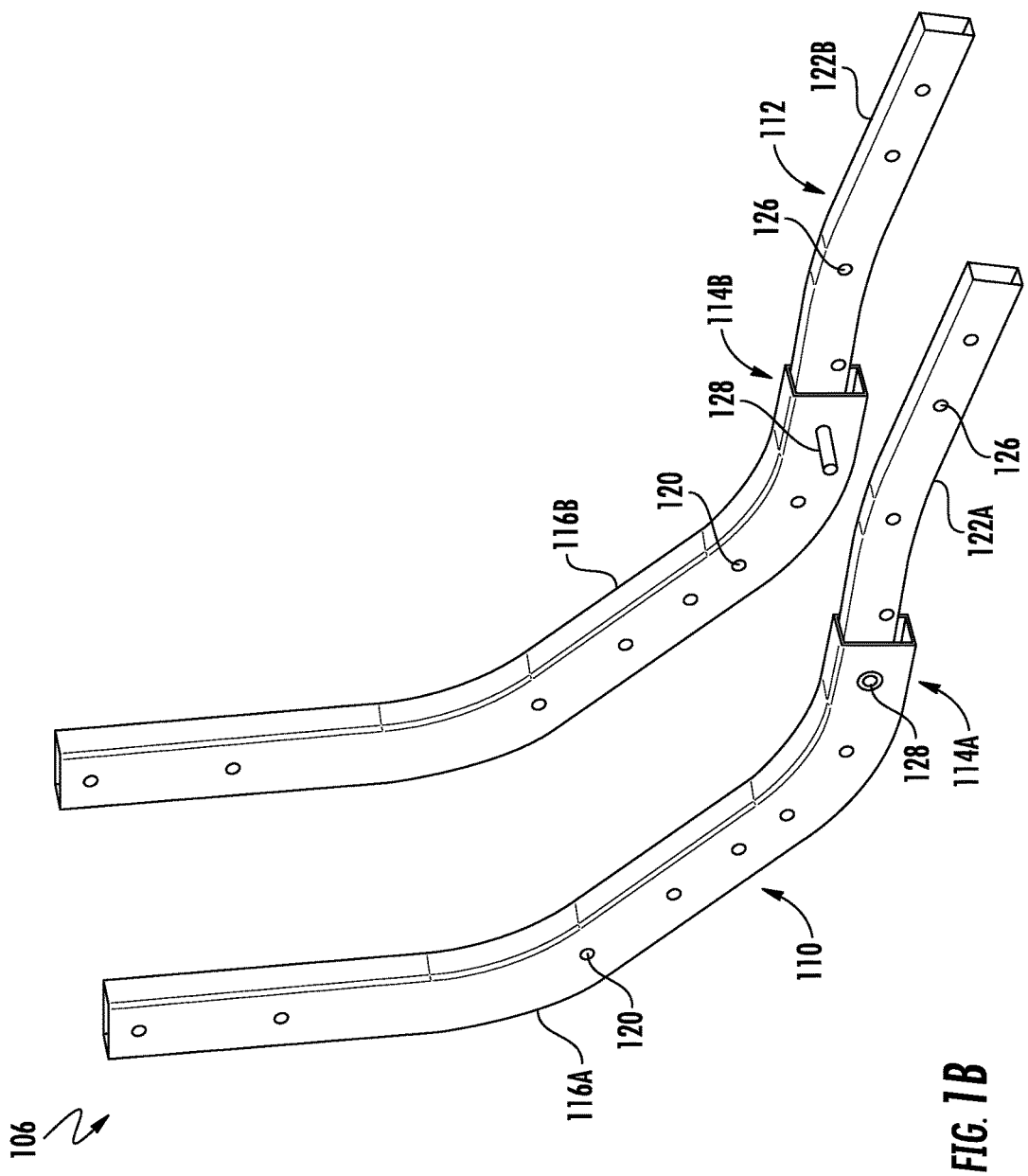

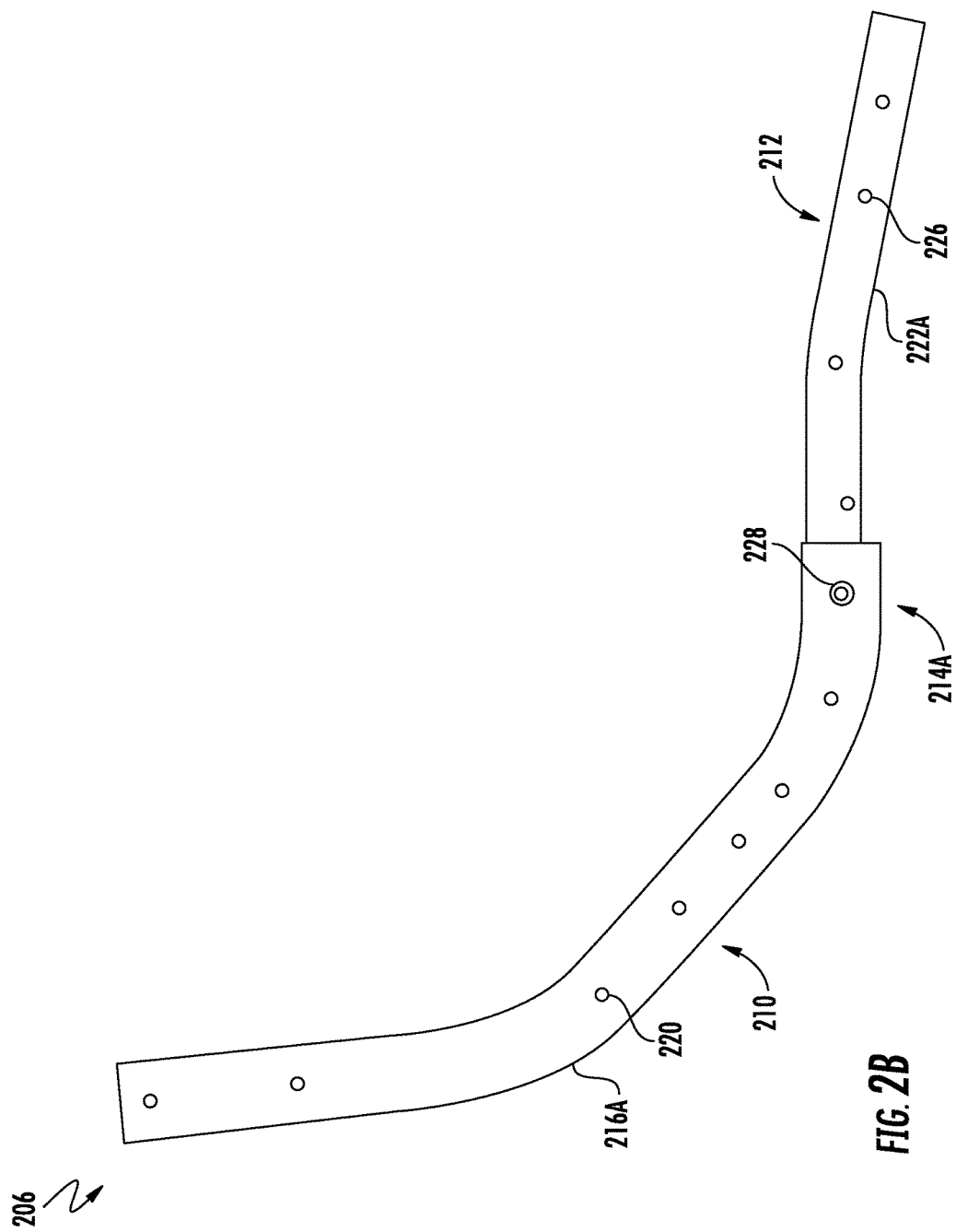

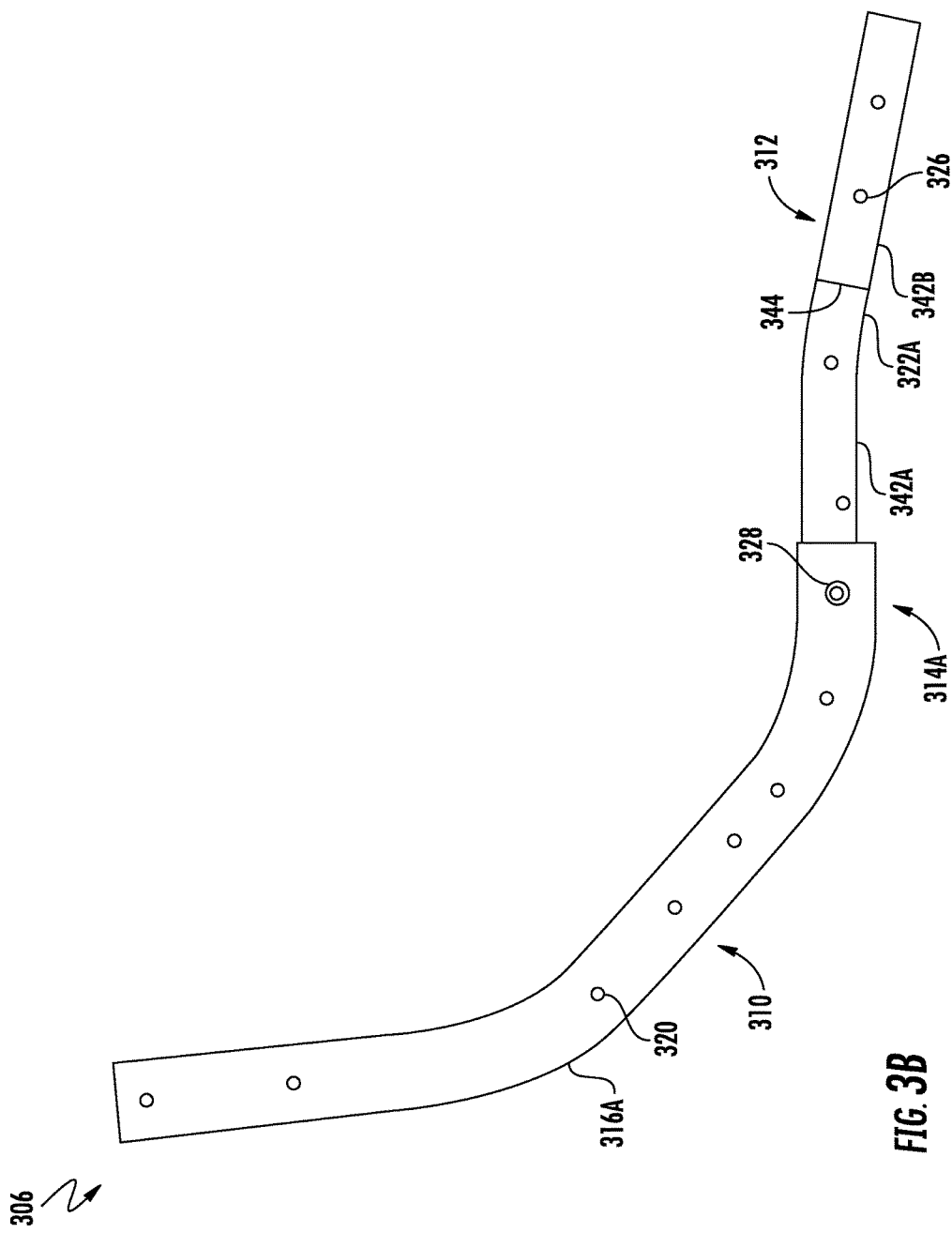

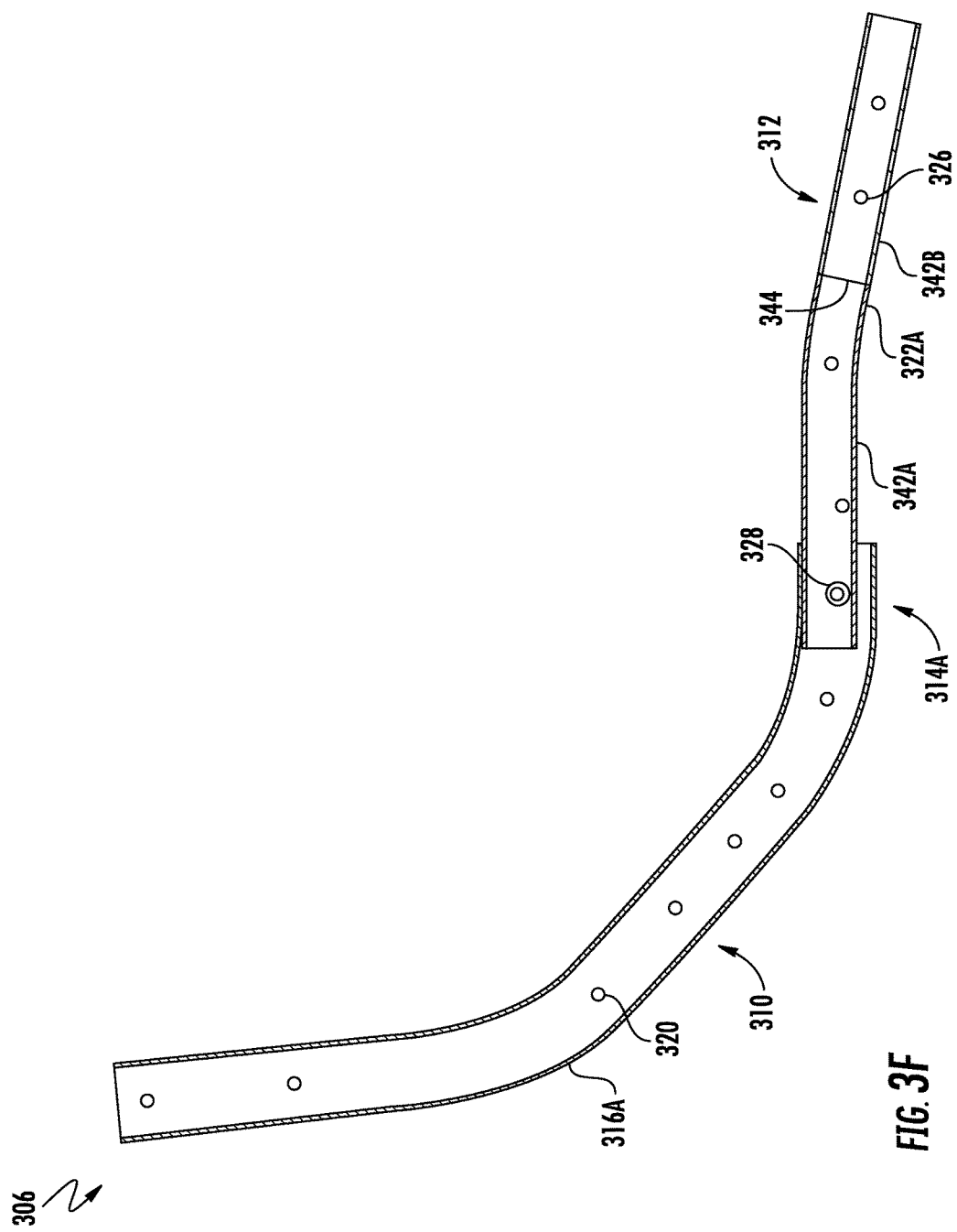

CAR SEAT WITH ENERGY MANAGING FRAME

CROSS-REFERENCE TO RELATED APPLICATIONS

The present application claims priority to and the benefit of U.S. Provisional Application No. 62/394,887, filed on Sep. 15, 2016, entitled "CAR SEAT WITH ENERGY MANAGING FRAME," which is hereby incorporated herein by reference in its entirety.

FIELD OF THE DISCLOSURE

The present disclosure relates generally to car seats for restraining an infant or small child in a vehicle and more particularly to a convertible car seat having a support frame configured for managing energy during both forward-facing and rear-facing crash events.

BACKGROUND

Various types of car seats are known in the art for restraining an infant or small child in a vehicle and protecting the child during a crash event. One type of car seat is a "convertible" car seat, which may be installed in a vehicle and secured to a vehicle seat in a forward-facing mode or a rear-facing mode, depending on the age and weight of the child. A convertible car seat generally may include a base that is secured to a vehicle seat, a seat shell that is mounted to the base and configured to support a child thereon, and a frame that provides structural integrity for the car seat. The frame generally may include an upper portion that supports an upper portion of the seat shell, and a lower portion that supports a lower portion of the seat shell. When the car seat is installed in the forward-facing mode, the base and the seat shell may orient the child to face the front of the vehicle, and when the car seat is installed in the rear-facing mode, the base and the seat shell may orient the child to face the back of the vehicle.

It is well understood that the forces acting on a convertible car seat during a crash event differ when the car seat is installed in a forward-facing mode as compared to when the car seat is installed in a rear-facing mode. However, certain existing convertible car seats may include a frame that does not adequately manage the energy created during both forward-facing and rear-facing crash events. For example, some existing convertible car seats may include a frame that is designed to optimize energy management when the car seat is in either the forward-facing mode or the rear-facing mode, while sacrificing performance when the car seat is in the other, non-optimized mode. Other existing convertible car seats may include a frame that is designed to balance performance when the car seat is in the forward-facing mode and the rear-facing mode, without providing optimal energy management in either mode. Certain existing convertible car seats may include additional, passive components, such as energy absorption components, that interact with the base, the seat shell, and/or the frame to improve energy management when the car seat is in either the forward-facing mode or the rear-facing mode. However, such additional components may increase the complexity, weight, and/or cost of the car seat and may complicate installation and/or use of the car seat. Moreover, the performance of such passive features may degrade over time and may not provide optimized energy management in the desired mode.

BRIEF DESCRIPTION OF THE DRAWINGS

The detailed description is set forth with reference to the accompanying drawings. The use of the same reference numerals may indicate similar or identical items. Various embodiments may utilize elements and/or features other than those illustrated in the drawings, and some elements and/or features may not be present in various embodiments. Elements and/or features in the drawings are not necessarily drawn to scale. Throughout this disclosure, depending on the context, singular and plural terminology may be used interchangeably.

FIG. 1B is a perspective view of the frame of the car seat of FIG. 1A.

FIG. 2B is a side view of the frame of FIG. 2A.

FIG. 3B is a side view of the frame of FIG. 3A.

FIG. 3F is a cross-sectional side view of the frame of FIG. 3A, taken along line 3F-3F of FIG. 3C.

DETAILED DESCRIPTION OF EXAMPLE EMBODIMENTS

Overview

Figure 1A:
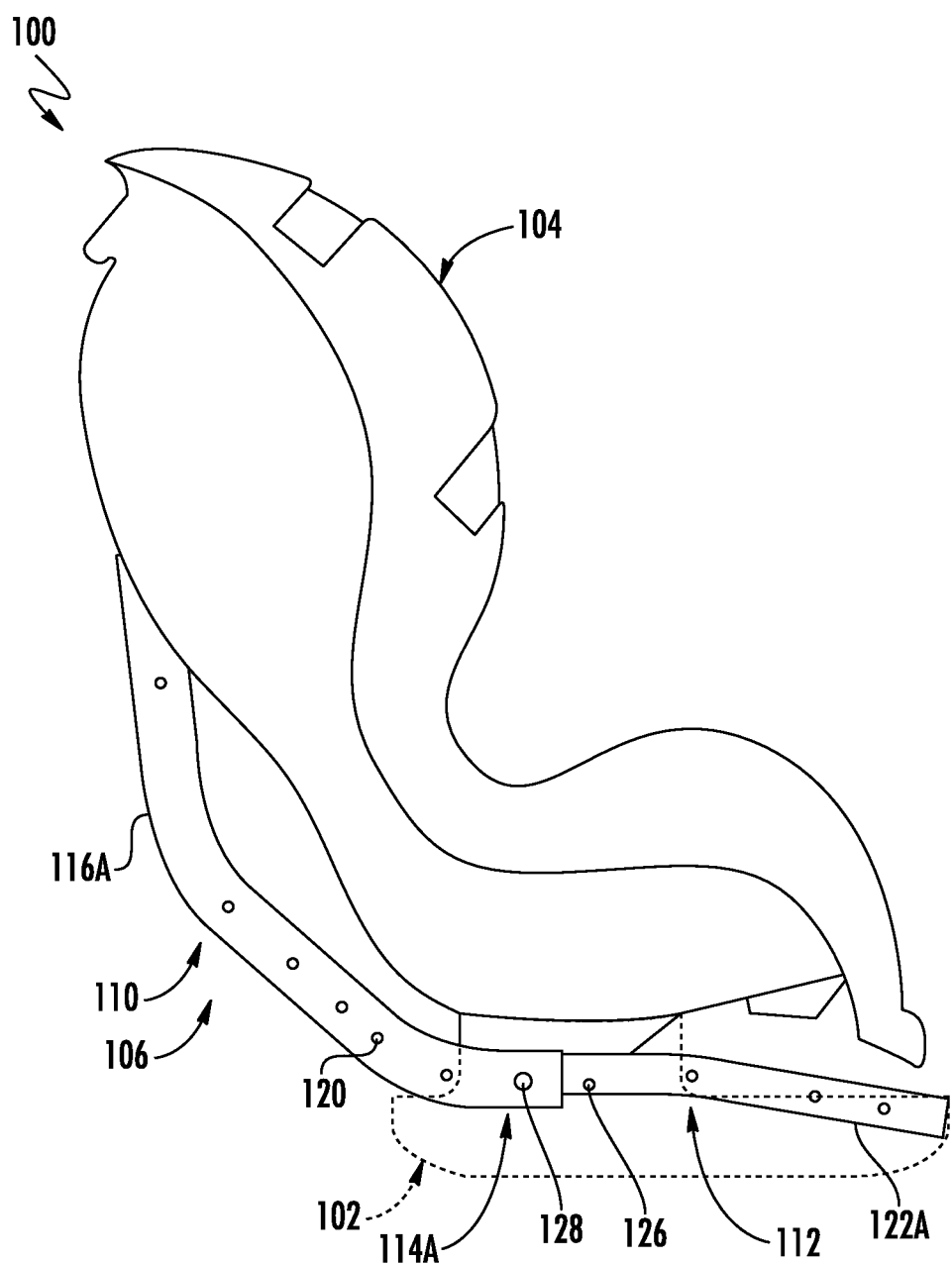
FIG. 1A is a side view of a car seat in accordance with one or more embodiments of the disclosure, showing a base, a seat shell, and a frame of the car seat.
Figure 1C:
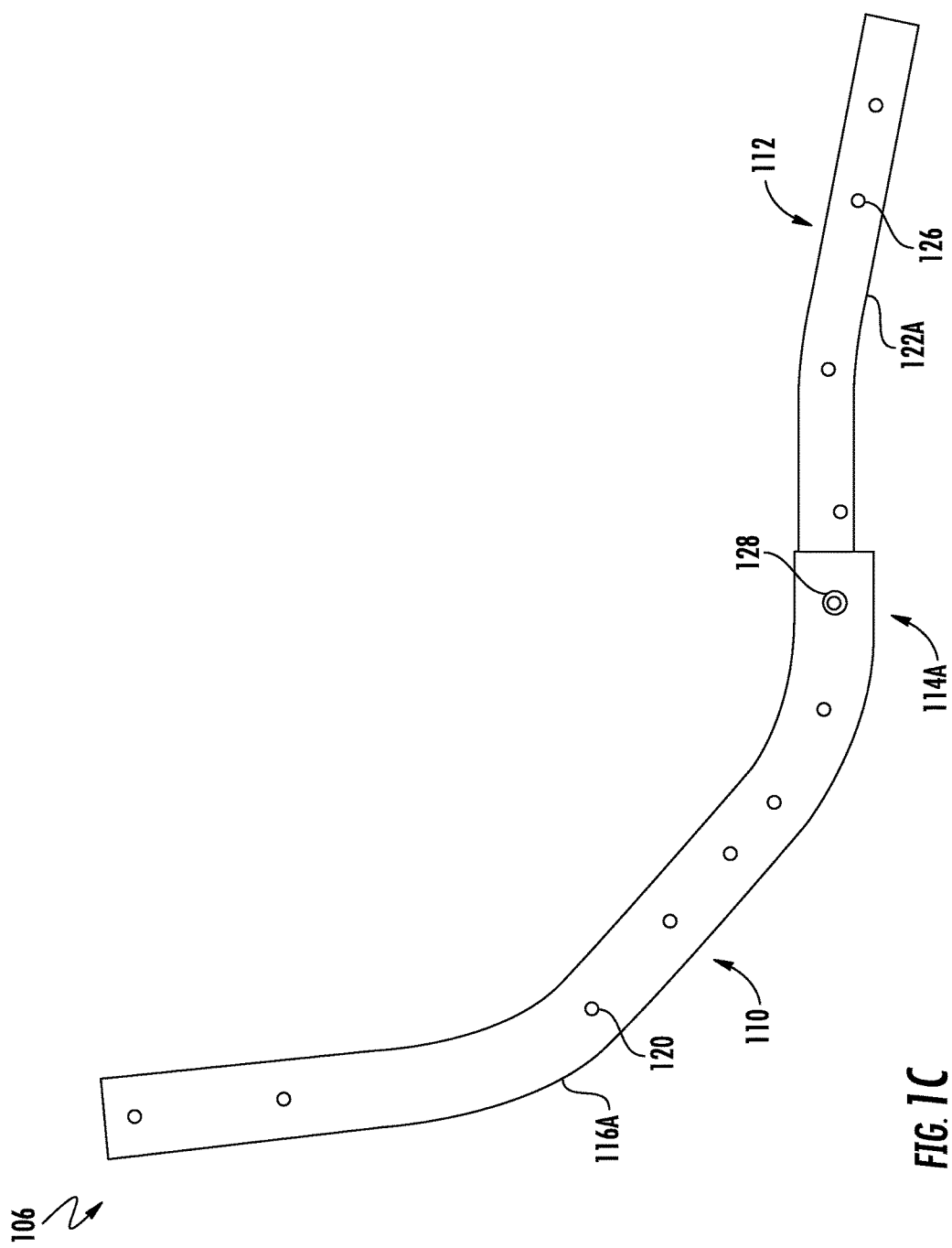
FIG. 1C is a side view of the frame of the car seat of FIG. 1A.
Figure 1D:
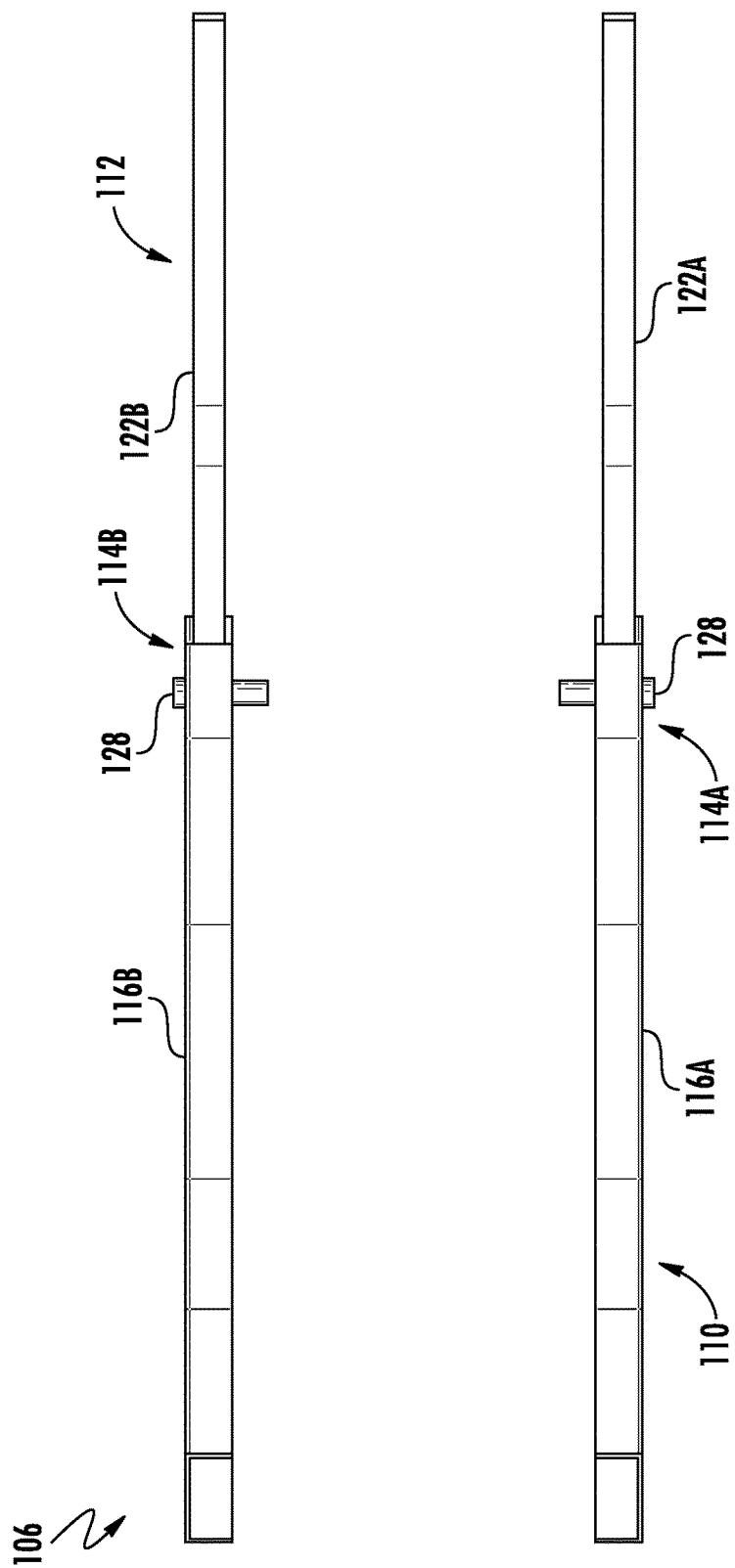
FIG. 1D is a top view of the frame of the car seat of FIG. 1A.
Figure 1F:
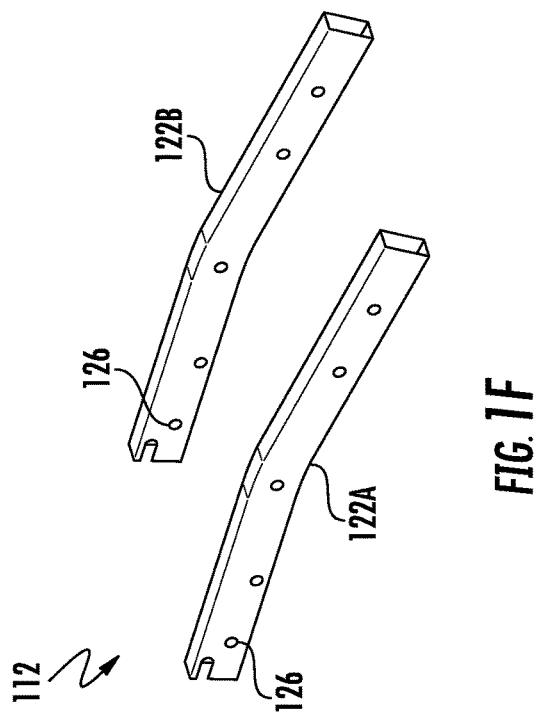
FIG. 1F is a perspective view of a second frame portion of the frame of the car seat of FIG. 1A.
Figure 1E:
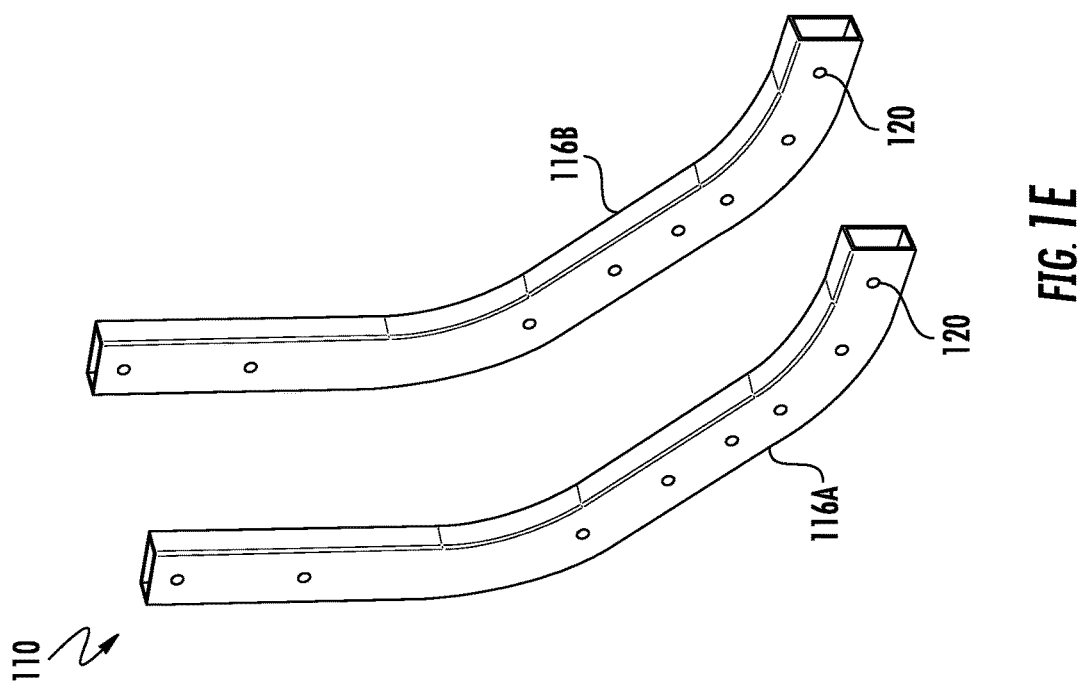
FIG. 1E is a perspective view of a first frame portion of the frame of the car seat of FIG. 1A.

Described below are example embodiments of a car seat as well as individual components, assemblies, and features of the car seat. The car seat may be used for restraining an infant or small child in a vehicle and protecting the child during a crash event. The car seat may be a convertible car seat, which may be installed in a vehicle and secured to a vehicle seat in a forward-facing mode or a rear-facing mode. As described below, the car seat may include a support frame that is configured for optimizing energy management during both forward-facing and rear-facing crash events. As compared to certain existing convertible car seats, embodiments of the car seat described herein may provide an active solution for optimizing energy management during both forward-facing and rear-facing crash events, may reduce or eliminate the need for passive components for energy management, may decrease the complexity, weight, or cost of the car seat, and/or may simplify installation and use of the car seat.

According to one aspect, a car seat may include a seat shell configured for supporting a child thereon, and a support frame positioned at least partially within the seat shell and configured to manage energy during a crash event. The support frame may include a first frame portion and a second frame portion attached to the first frame portion. The first frame portion may include a first side support and a second side support spaced apart from one another, and the second frame portion may include a first side support and a second side support spaced apart from one another.

In certain example embodiments, a stiffness of each of the first side support and the second side support of the second frame portion may be different than a stiffness of each of the first side support and the second side support of the first frame portion. In certain example embodiments, a stiffness of each of the first side support and the second side support of the second frame portion may be less than a stiffness of each of the first side support and the second side support of the first frame portion. In certain example embodiments, each of the first side support and the second side support of the second frame portion may have a cross sectional area that is less than a cross-sectional area of each of the first side support and the second side support of the first frame portion. In certain example embodiments, each of the first side support and the second side support of the second frame portion may have a cross-sectional area that varies along a length thereof. In certain example embodiments, each of the first side support and the second side support of the second frame portion may have a wall thickness that is less than a wall thickness of each of the first side support and the second side support of the first frame portion. In certain example embodiments, each of the first side support and the second side support of the second frame portion may have a wall thickness that varies along a length thereof. In certain example embodiments, each of the first side support and the second side support of the second frame portion may be formed of a material having a stiffness that is less than a stiffness of a material of each of the first side support and the second side support of the first frame portion. In certain example embodiments, each of the first side support and the second side support of the second frame portion may include one or more apertures, holes, slots, indents, or other negative features defined therein and configured to decrease the stiffness of the first side support and the second side support of the second frame portion. In certain example embodiments, each of the first side support and the second side support of the second frame portion may include one or more slots extending through sidewalls of the first side support and the second side support of the second frame portion and configured to decrease the stiffness of the first side support and the second side support of the second frame portion.

In certain example embodiments, each of the first side support and the second side support of the second frame portion may be configured to controllably deform at a predetermined portion thereof. In certain example embodiments, the predetermined portion may be an end portion of each of the first side support and the second side support of the second frame portion. In certain example embodiments, each of the first side support and the second side support of the first frame portion and the first side support and the second side support of the second frame portion may be formed as a tubular member. In certain example embodiments, each of the first side support and the second side support of the first frame portion and the first side support and the second side support of the second frame portion may be formed as a plate or a bar. In certain example embodiments, the first side support of the second frame portion may be integrally formed with the first side support of the first frame portion, and the second side support of the second frame portion may be integrally formed with the second side support of the first frame portion.

In certain example embodiments, each of the first side support and the second side support of the second frame portion may include a first portion attached to a second portion at a joint. In certain example embodiments, a stiffness of the first portion may be different than a stiffness of the second portion. In certain example embodiments, a cross-sectional area of the first portion may be different than a cross-sectional area of the second portion. In certain example embodiments, a wall thickness of the first portion may be different than a cross-sectional area of the second portion. In certain example embodiments, a material of the first portion may be different than a material of the second portion. In certain example embodiments, a stiffness of the first portion may be equal to or substantially equal to a stiffness of the second portion. In certain example embodiments, a stiffness of the joint may be less than each of the stiffness of the first portion and the stiffness of the second portion. In certain example embodiments, each of the first side support and the second side support of the second frame portion may be configured to controllably deform at a predetermined portion along the first portion, the second portion, or the joint.

In certain example embodiments, the second frame portion may be attached to the first frame portion at a first joint connection between the first side support of the second frame portion and the first side support of the first frame portion and at a second joint connection between the second side support of the second frame portion and the second side support of the first frame portion, a stiffness of the first joint connection may be less than each of a stiffness of the first side support of the second frame portion and a stiffness of the first side support of the first frame portion, and a stiffness of the second joint connection may be less than each of a stiffness of the second side support of the second frame portion and a stiffness of the second side support of the first frame portion.

In certain example embodiments, the first joint connection may be formed by an end portion of the first side support of the second frame portion and an end portion of the first side support of the first frame portion, and wherein the second joint connection may be formed by an end portion of the second side support of the second frame portion and an end portion of the second side support of the first frame portion. In certain example embodiments, the end portion of the first side support of the second frame portion may be positioned within the end portion of the first side support of the first frame portion at the first joint connection, and the end portion of the second side support of the second frame portion may be positioned within the end portion of the second side support of the first frame portion at the second joint connection. In certain example embodiments, each of the end portions of the first side support and the second side support of the second frame portion may include one or more apertures, holes, slots, indents, or other negative features defined therein and configured to decrease the stiffness of the end portions of the first side support and the second side support of the second frame portion. In certain example embodiments, each of the end portions of the first side support and the second side support of the second frame portion may include one or more slots extending through sidewalls of the first side support and the second side support of the second frame portion and configured to decrease the stiffness of the end portions of the first side support and the second side support of the second frame portion. In certain example embodiments, the end portion of the first side support of the second frame portion may be attached to the end portion of the first side support of the first frame portion at the first joint connection by a first fastener, and the end portion of the second side support of the second frame portion may be attached to the end portion of the second side support of the first frame portion at the second joint connection by a second fastener.

In certain example embodiments, the car seat may include a first dampening member positioned about the first joint connection and configured to absorb energy during a crash event, and a second dampening member positioned about the second joint connection and configured to absorb energy during a crash event. In certain example embodiments, the stiffness of the first side support of the second frame portion may be equal to or substantially equal to the stiffness of the first side support of the first frame portion, and the stiffness of the second side support of the second frame portion may be equal to or substantially equal to the stiffness of the second side support of the first frame portion. In certain example embodiments, the stiffness of the first side support of the second frame portion may be different than the stiffness of the first side support of the first frame portion, and the stiffness of the second side support of the second frame portion may be different than the stiffness of the second side support of the first frame portion. In certain example embodiments, the first dampening member may be positioned within an end portion of the first side support of the first frame portion and below an end portion of the first side support of the second frame portion, and the second dampening member may be positioned within an end portion of the second side support of the first frame portion and below an end portion of the second side support of the second frame portion. In certain example embodiments, the first dampening member and the second dampening member each may be formed as a solid or substantially solid block. In certain example embodiments, the first dampening member and the second dampening member each may include one or more apertures, slots, voids, or other negative features configured to facilitate absorption of energy during a crash event. In certain example embodiments, the first dampening member and the second dampening member each may be formed of a metal, a metal alloy, a plastic, a composite material, a foam material, an elastic material, or combinations thereof.

In certain example embodiments, each of the first side support and the second side support of the second frame portion may include a first portion attached to a second portion at a joint. In certain example embodiments, a stiffness of the first portion may be different than a stiffness of the second portion. In certain example embodiments, a stiffness of the joint may be less than each of the stiffness of the first portion and the stiffness of the second portion. In certain example embodiments, each of the first side support and the second side support of the second frame portion may be configured to controllably deform at a predetermined portion along the first portion, the second portion, or the joint. In certain example embodiments, the stiffness of each of the first side support and the second side support of the second frame portion may be different than the stiffness of each of the first side support and the second side support of the first frame portion.

In certain example embodiments, the seat shell may include a plurality of portions separately formed and attached to one another. In certain example embodiments, the car seat may include a base supporting the seat shell. In certain example embodiments, the base may include a plurality of portions separately formed and attached to one another. In certain example embodiments, the car seat may be a convertible car seat configured for installing in a vehicle and securing to a vehicle seat in a forward-facing mode or a rear-facing mode. In certain example embodiments, the support frame may be configured to maintain its original shape during a crash event when the car seat is installed in the forward-facing mode. In certain example embodiments, a portion of the support frame may be configured to controllably deform from its original shape to a deformed shape during a crash event when the car seat is installed in the rear-facing mode. In certain example embodiments, a portion of the second frame portion may be configured to controllably deform from its original shape to a deformed shape during a crash event when the car seat is installed in the rear-facing mode. In certain example embodiments, a joint connection of the support frame may be configured to controllably deform from its original shape to a deformed shape during a crash event when the car seat is installed in the rear-facing mode. In certain example embodiments, a number of joint connections of the support frame may be configured to controllably deform from their original shape to a deformed shape during a crash event when the car seat is installed in the rear-facing mode.

In certain example embodiments, the car seat may include a belt path configured for receiving a vehicle seat belt when the car seat is installed in a vehicle, and the belt path may be positioned along the support frame. In certain example embodiments, the car seat may include a forward-facing belt path configured for receiving a vehicle seat belt when the car seat is installed in a vehicle in a forward-facing mode, and a rear-facing belt path configured for receiving a vehicle seat belt when the car seat is installed in a vehicle in a rear-facing mode, and the support frame may extend between the forward-facing belt path and the rear-facing belt path. In certain example embodiments, the car seat may include a number of harness points configured for attaching a harness thereto, and the support frame may connect the harness points. In certain example embodiments, the first frame portion may be an upper frame portion of the support frame, and the second frame portion may be a lower frame portion of the support frame. In certain example embodiments, the support frame may be positioned entirely within the seat shell.

According to another aspect, a car seat may include a seat shell configured for supporting a child thereon, a base supporting the seat shell, and a support frame positioned at least partially within the base and configured to manage energy during a crash event. The support frame may include a first frame portion and a second frame portion attached to the first frame portion. The first frame portion may include a first side support and a second side support spaced apart from one another, and the second frame portion may include a first side support and a second side support spaced apart from one another.

In certain example embodiments, a stiffness of each of the first side support and the second side support of the second frame portion may be different than a stiffness of each of the first side support and the second side support of the first frame portion. In certain example embodiments, a stiffness of each of the first side support and the second side support of the second frame portion may be less than a stiffness of each of the first side support and the second side support of the first frame portion. In certain example embodiments, each of the first side support and the second side support of the second frame portion may have a cross sectional area that is less than a cross-sectional area of each of the first side support and the second side support of the first frame portion. In certain example embodiments, each of the first side support and the second side support of the second frame portion may have a cross-sectional area that varies along a length thereof. In certain example embodiments, each of the first side support and the second side support of the second frame portion may have a wall thickness that is less than a wall thickness of each of the first side support and the second side support of the first frame portion. In certain example embodiments, each of the first side support and the second side support of the second frame portion may have a wall thickness that varies along a length thereof. In certain example embodiments, each of the first side support and the second side support of the second frame portion may be formed of a material having a stiffness that is less than a stiffness of a material of each of the first side support and the second side support of the first frame portion. In certain example embodiments, each of the first side support and the second side support of the second frame portion may include one or more apertures, holes, slots, indents, or other negative features defined therein and configured to decrease the stiffness of the first side support and the second side support of the second frame portion. In certain example embodiments, each of the first side support and the second side support of the second frame portion may include one or more slots extending through sidewalls of the first side support and the second side support of the second frame portion and configured to decrease the stiffness of the first side support and the second side support of the second frame portion.

In certain example embodiments, each of the first side support and the second side support of the second frame portion may be configured to controllably deform at a predetermined portion thereof. In certain example embodiments, the predetermined portion may be an end portion of each of the first side support and the second side support of the second frame portion. In certain example embodiments, each of the first side support and the second side support of the first frame portion and the first side support and the second side support of the second frame portion may be formed as a tubular member. In certain example embodiments, each of the first side support and the second side support of the first frame portion and the first side support and the second side support of the second frame portion may be formed as a plate or a bar. In certain example embodiments, the first side support of the second frame portion may be integrally formed with the first side support of the first frame portion, and the second side support of the second frame portion may be integrally formed with the second side support of the first frame portion.

In certain example embodiments, each of the first side support and the second side support of the second frame portion may include a first portion attached to a second portion at a joint. In certain example embodiments, a stiffness of the first portion may be different than a stiffness of the second portion. In certain example embodiments, a cross-sectional area of the first portion may be different than a cross-sectional area of the second portion. In certain example embodiments, a wall thickness of the first portion may be different than a cross-sectional area of the second portion. In certain example embodiments, a material of the first portion may be different than a material of the second portion. In certain example embodiments, a stiffness of the first portion may be equal to or substantially equal to a stiffness of the second portion. In certain example embodiments, a stiffness of the joint may be less than each of the stiffness of the first portion and the stiffness of the second portion. In certain example embodiments, each of the first side support and the second side support of the second frame portion may be configured to controllably deform at a predetermined portion along the first portion, the second portion, or the joint.

In certain example embodiments, the second frame portion may be attached to the first frame portion at a first joint connection between the first side support of the second frame portion and the first side support of the first frame portion and at a second joint connection between the second side support of the second frame portion and the second side support of the first frame portion, a stiffness of the first joint connection may be less than each of a stiffness of the first side support of the second frame portion and a stiffness of the first side support of the first frame portion, and a stiffness of the second joint connection may be less than each of a stiffness of the second side support of the second frame portion and a stiffness of the second side support of the first frame portion.

In certain example embodiments, the first joint connection may be formed by an end portion of the first side support of the second frame portion and an end portion of the first side support of the first frame portion, and the second joint connection may be formed by an end portion of the second side support of the second frame portion and an end portion of the second side support of the first frame portion. In certain example embodiments, the end portion of the first side support of the second frame portion may be positioned within the end portion of the first side support of the first frame portion at the first joint connection, and the end portion of the second side support of the second frame portion may be positioned within the end portion of the second side support of the first frame portion at the second joint connection. In certain example embodiments, each of the end portions of the first side support and the second side support of the second frame portion may include one or more apertures, holes, slots, indents, or other negative features defined therein and configured to decrease the stiffness of the end portions of the first side support and the second side support of the second frame portion. In certain example embodiments, each of the end portions of the first side support and the second side support of the second frame portion may include one or more slots extending through sidewalls of the first side support and the second side support of the second frame portion and configured to decrease the stiffness of the end portions of the first side support and the second side support of the second frame portion. In certain example embodiments, the end portion of the first side support of the second frame portion may be attached to the end portion of the first side support of the first frame portion at the first joint connection by a first fastener, and the end portion of the second side support of the second frame portion may be attached to the end portion of the second side support of the first frame portion at the second joint connection by a second fastener.

In certain example embodiments, the car seat may include a first dampening member positioned about the first joint connection and configured to absorb energy during a crash event, and a second dampening member positioned about the second joint connection and configured to absorb energy during a crash event. In certain example embodiments, the stiffness of the first side support of the second frame portion may be equal to or substantially equal to the stiffness of the first side support of the first frame portion, and the stiffness of the second side support of the second frame portion may be equal to or substantially equal to the stiffness of the second side support of the first frame portion. In certain example embodiments, the stiffness of the first side support of the second frame portion may be different than the stiffness of the first side support of the first frame portion, and the stiffness of the second side support of the second frame portion may be different than the stiffness of the second side support of the first frame portion. In certain example embodiments, the first dampening member may be positioned within an end portion of the first side support of the first frame portion and below an end portion of the first side support of the second frame portion, and the second dampening member may be positioned within an end portion of the second side support of the first frame portion and below an end portion of the second side support of the second frame portion. In certain example embodiments, the first dampening member and the second dampening member each may be formed as a solid or substantially solid block. In certain example embodiments, the first dampening member and the second dampening member each may include one or more apertures, slots, voids, or other negative features configured to facilitate absorption of energy during a crash event. In certain example embodiments, the first dampening member and the second dampening member each may be formed of a metal, a metal alloy, a plastic, a composite material, a foam material, an elastic material, or combinations thereof.

In certain example embodiments, each of the first side support and the second side support of the second frame portion may include a first portion attached to a second portion at a joint. In certain example embodiments, a stiffness of the first portion may be different than a stiffness of the second portion. In certain example embodiments, a stiffness of the joint may be less than each of the stiffness of the first portion and the stiffness of the second portion. In certain example embodiments, each of the first side support and the second side support of the second frame portion may be configured to controllably deform at a predetermined portion along the first portion, the second portion, or the joint. In certain example embodiments, the stiffness of each of the first side support and the second side support of the second frame portion may be different than the stiffness of each of the first side support and the second side support of the first frame portion.

In certain example embodiments, the seat shell may include a plurality of portions separately formed and attached to one another. In certain example embodiments, the base may include a plurality of portions separately formed and attached to one another. In certain example embodiments, the car seat may be a convertible car seat configured for installing in a vehicle and securing to a vehicle seat in a forward-facing mode or a rear-facing mode. In certain example embodiments, the support frame may be configured to maintain its original shape during a crash event when the car seat is installed in the forward-facing mode. In certain example embodiments, a portion of the support frame may be configured to controllably deform from its original shape to a deformed shape during a crash event when the car seat is installed in the rear-facing mode. In certain example embodiments, a portion of the second frame portion may be configured to controllably deform from its original shape to a deformed shape during a crash event when the car seat is installed in the rear-facing mode. In certain example embodiments, a joint connection of the support frame may be configured to controllably deform from its original shape to a deformed shape during a crash event when the car seat is installed in the rear-facing mode. In certain example embodiments, a number of joint connections of the support frame may be configured to controllably deform from their original shape to a deformed shape during a crash event when the car seat is installed in the rear-facing mode.

In certain example embodiments, the car seat may include a belt path configured for receiving a vehicle seat belt when the car seat is installed in a vehicle, and the belt path may be positioned along the support frame. In certain example embodiments, the car seat may include a forward-facing belt path configured for receiving a vehicle seat belt when the car seat is installed in a vehicle in a forward-facing mode, and a rear-facing belt path configured for receiving a vehicle seat belt when the car seat is installed in a vehicle in a rear-facing mode, and the support frame may extend between the forward-facing belt path and the rear-facing belt path. In certain example embodiments, the car seat may include a number of harness points configured for attaching a harness thereto, and the support frame may connect the harness points. In certain example embodiments, the first frame portion may be an upper frame portion of the support frame, and the second frame portion may be a lower frame portion of the support frame. In certain example embodiments, the support frame may be positioned entirely within the base.

According to still another aspect, a car seat may include a seat shell configured for supporting a child thereon, a base supporting the seat shell, and a support frame positioned at least partially within the seat shell and/or the base and configured to manage energy during a crash event. The support frame may include a first frame portion and a second frame portion attached to the first frame portion. The first frame portion may include a first support, and the second frame portion may include a first support.

In certain example embodiments, a stiffness of the first support of the second frame portion may be different than a stiffness of the first support of the first frame portion. In certain example embodiments, a stiffness of the first support of the second frame portion may be less than a stiffness of the first support of the first frame portion. In certain example embodiments, the first support of the second frame portion may have a cross sectional area that is less than a cross-sectional area of the first support of the first frame portion. In certain example embodiments, the first support of the second frame portion may have a cross-sectional area that varies along a length thereof. In certain example embodiments, the first support of the second frame portion may have a wall thickness that is less than a wall thickness of the first support of the first frame portion. In certain example embodiments, the first support of the second frame portion may have a wall thickness that varies along a length thereof. In certain example embodiments, the first support of the second frame portion may be formed of a material having a stiffness that is less than a stiffness of a material of the first support of the first frame portion. In certain example embodiments, the first support of the second frame portion may include one or more apertures, holes, slots, indents, or other negative features defined therein and configured to decrease the stiffness of the first support of the second frame portion. In certain example embodiments, the first support of the second frame portion may include one or more slots extending through sidewalls of the first support of the second frame portion and configured to decrease the stiffness of the first support of the second frame portion.

In certain example embodiments, the first support of the second frame portion may be configured to controllably deform at a predetermined portion thereof. In certain example embodiments, the predetermined portion may be an end portion of the first support of the second frame portion. In certain example embodiments, the predetermined portion may be an intermediate portion spaced apart from an end portion of the first support of the second frame portion. In certain example embodiments, each of the first support of the first frame portion and the first support of the second frame portion may be formed as a tubular member. In certain example embodiments, each of the first support of the first frame portion and the first support of the second frame portion may be formed as a plate or a bar. In certain example embodiments, wherein the first support of the second frame portion may be integrally formed with the first support of the first frame portion.

In certain example embodiments, the first support of the second frame portion may include a first section attached to a second section at a joint. In certain example embodiments, a stiffness of the first section may be different than a stiffness of the second section. In certain example embodiments, a cross-sectional area of the first section may be different than a cross-sectional area of the second section. In certain example embodiments, a wall thickness of the first section may be different than a cross-sectional area of the second section. In certain example embodiments, a material of the first section may be different than a material of the second section. In certain example embodiments, a stiffness of the first section may be equal to or substantially equal to a stiffness of the second section. In certain example embodiments, the first support of the second frame portion may be configured to controllably deform at a predetermined portion along the first section, the second section, or the joint.

In certain example embodiments, the second frame portion may be attached to the first frame portion at a first joint connection between the first support of the second frame portion and the first support of the first frame portion, and a stiffness of the first joint connection may be less than each of a stiffness of the first support of the second frame portion and a stiffness of the first support of the first frame portion. In certain example embodiments, the first joint connection may be formed by an end portion of the first support of the second frame portion and an end portion of the first support of the first frame portion. In certain example embodiments, the end portion of the first support of the second frame portion may be positioned within the end portion of the first support of the first frame portion at the first joint connection. In certain example embodiments, the end portion of the first support of the second frame portion may include one or more apertures, holes, slots, indents, or other negative features defined therein and configured to decrease the stiffness of the end portion of the first support of the second frame portion. In certain example embodiments, the end portion of the first support of the second frame portion may include one or more slots extending through sidewalls of the first support of the second frame portion and configured to decrease the stiffness of the end portion of the first support of the second frame portion. In certain example embodiments, the end portion of the first support of the second frame portion may be attached to the end portion of the first support of the first frame portion at the first joint connection by a first fastener.

In certain example embodiments, the car seat may include a first dampening member positioned about the first joint connection and configured to absorb energy during a crash event. In certain example embodiments, the stiffness of the first support of the second frame portion may be equal to or substantially equal to the stiffness of the first support of the first frame portion. In certain example embodiments, the stiffness of the first support of the second frame portion may be different than the stiffness of the first support of the first frame portion. In certain example embodiments, the first dampening member may be positioned within an end portion of the first support of the first frame portion and below an end portion of the first support of the second frame portion. In certain example embodiments, the first dampening member may be formed as a solid or substantially solid block. In certain example embodiments, the first dampening member may include one or more apertures, slots, voids, or other negative features configured to facilitate absorption of energy during a crash event. In certain example embodiments, the first dampening member may be formed of a metal, a metal alloy, a plastic, a composite material, a foam material, an elastic material, or combinations thereof.

In certain example embodiments, the first support of the second frame portion may include a first section attached to a second section at a joint. In certain example embodiments, a stiffness of the first section may be different than a stiffness of the second section. In certain example embodiments, a stiffness of the first section may be equal to or substantially equal to a stiffness of the second section. In certain example embodiments, a stiffness of the joint may be less than each of the stiffness of the first section and the stiffness of the second section. In certain example embodiments, the first support of the second frame portion may be configured to controllably deform at a predetermined portion along the first section, the second section, or the joint.

In certain example embodiments, the stiffness of the first support of the second frame portion may be different than the stiffness of the first support of the first frame portion. In certain example embodiments, the seat shell may include a number of portions separately formed and attached to one another. In certain example embodiments, the base may include a number of portions separately formed and attached to one another. In certain example embodiments, the car seat may be a convertible car seat configured for installing in a vehicle and securing to a vehicle seat in a forward-facing mode or a rear-facing mode. In certain example embodiments, the support frame may be configured to maintain its original shape during a crash event when the car seat is installed in the forward-facing mode. In certain example embodiments, a portion of the support frame may be configured to controllably deform from its original shape to a deformed shape during a crash event when the car seat is installed in the rear-facing mode. In certain example embodiments, the second frame portion may be configured to controllably deform from its original shape to a deformed shape during a crash event when the car seat is installed in the rear-facing mode. In certain example embodiments, a joint connection of the support frame may be configured to controllably deform from its original shape to a deformed shape during a crash event when the car seat is installed in the rear-facing mode. In certain example embodiments, a number of joint connections of the support frame may be configured to controllably deform from their original shape to a deformed shape during a crash event when the car seat is installed in the rear-facing mode.

In certain example embodiments, the car seat may include a belt path configured for receiving a vehicle seat belt when the car seat is installed in a vehicle, and the belt path may be positioned along the support frame. In certain example embodiments, the car seat may include a forward-facing belt path configured for receiving a vehicle seat belt when the car seat is installed in a vehicle in a forward-facing mode, and a rear-facing belt path configured for receiving a vehicle seat belt when the car seat is installed in a vehicle in a rear-facing mode, and the support frame may extend between the forward-facing belt path and the rear-facing belt path. In certain example embodiments, the car seat may include a number of harness points configured for attaching a harness thereto, and the support frame may connect the harness points. In certain example embodiments, the first frame portion may be an upper frame portion of the support frame, and the second frame portion may be a lower frame portion of the support frame. In certain example embodiments, the support frame may be positioned at least partially within the seat shell. In certain example embodiments, the support frame may be positioned entirely within the seat shell. In certain example embodiments, the support frame may be positioned at least partially within the base. In certain example embodiments, the support frame may be positioned entirely within the base.

These and other example embodiments of the disclosure are described in more detail through reference to the accompanying drawings in the detailed description that follows. This brief overview, including section titles and corresponding summaries, is provided for the reader's convenience and is not intended to limit the scope of the claims or the preceding sections. Furthermore, the techniques described above and below may be implemented in a number of ways and in a number of contexts. Several example implementations and contexts are provided with reference to the accompanying drawings, as described below in more detail. However, the following implementations and contexts are but a few of many.

Certain features of the car seat and components and assemblies thereof are described herein with reference to example embodiments illustrated in the drawings; however, such features are not limited to the example embodiments illustrated in the drawings. Certain relationships between components or features of the car seat are described herein using the term "substantially." As used herein, the term "substantially equal" indicates that the equal relationship is not a strict relationship and does not exclude functionally similar variations therefrom. Unless context or the description indicates otherwise, the use of the term "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom.

Illustrative Embodiments

FIGS. 1A-1H illustrate a car seat 100 (which also may be referred to as a "convertible car seat") in accordance with one or more example embodiments of the disclosure. The car seat 100 may be used for restraining an infant or small child in a vehicle and protecting the child during a crash event. The car seat 100 may be a convertible car seat, which may be installed in a vehicle and secured to a vehicle seat in a forward-facing mode or a rear-facing mode. As described below, the car seat 100 may include a frame that is configured for optimizing energy management during both forward-facing and rear-facing crash events. As compared to certain existing convertible car seats, embodiments of the car seat 100 described herein may provide an active solution for optimizing energy management during both forward-facing and rear-facing crash events, may reduce or eliminate the need for passive components for energy management, may decrease the complexity, weight, or cost of the car seat, and/or may simplify installation and use of the car seat.

As shown in FIG. 1A, the car seat 100 may include a base 102 (which also may be referred to as a "base support" or a "base support structure") and a seat shell 104 (which also may be referred to as a "seat," a "shell," or a "seat structure") that is supported by the base 102. The base 102 is shown in FIG. 1A via dashed lines for illustration purposes. The seat shell 104 may be mounted, either removably or permanently, to the base 102 and may be configured for supporting a child thereon. In this manner, the seat shell 104 may include a seat back surface configured for supporting the child's back, and a seat bottom surface configured for supporting the child's bottom. In certain example embodiments, as shown, the base 102 may be positioned below the seat shell 104. In other example embodiments, the base 102 may be positioned at least partially within the seat shell 104. In certain example embodiments, the seat shell 104 may be directly mounted to the base 102 via one or more fasteners or other connection mechanisms. In other example embodiments, the seat shell 104 may be indirectly mounted to the base 102 via one or more intermediate components positioned between the seat shell 104 and the base 102. In certain example embodiments, the seat shell 104 may be movably mounted to the base 102, such that a position and/or orientation of the seat shell 104 relative to the base 102 may be selectively adjusted by a user and maintained during use of the car seat 100. In other example embodiments, the seat shell 104 may be fixedly mounted to the base 102, such that the position and orientation of the seat shell 104 relative to the base 102 cannot be adjusted. As described above, the car seat 100 may be a convertible car seat, which may be installed in a vehicle and secured to a vehicle seat in a forward-facing mode or a rear-facing mode. In this manner, when the car seat 100 is installed in the forward-facing mode, the base 102 and the seat shell 104 may orient the child to face the front of the vehicle, and when the car seat 100 is installed in the rear-facing mode, the base 102 and the seat shell 104 may orient the child to face the back of the vehicle. In certain example embodiments, the base 102 may be a unitary component. In other example embodiments, the base 102 may include a number of components or portions that are separately formed and attached to one another. In certain example embodiments, the seat shell 104 may be a unitary component. In other example embodiments, the seat shell 104 may include a number of components or portions that are separately formed and attached to one another. It will be appreciated that the car seat 100 may include other components, in addition to the base 102 and the seat shell 104, as may be desired for restraining and protecting the child, for securing the car seat 100 to the vehicle seat, or for other purposes. Moreover, it will be appreciated that the illustrated embodiments of the base 102 and the seat shell 104 are merely example embodiments, and that other embodiments of the base 102 and the seat shell 104 may be used for the car seat 100.

As shown in FIG. 1A, the car seat 100 also may include a support frame 106 (which also may be referred to as a "structural frame" or simply a "frame") configured to manage energy during a crash event. In certain example embodiments, the support frame 106 may be positioned entirely or at least partially within the seat shell 104. In certain example embodiments, the support frame 106 may be positioned entirely or at least partially within the base 102. In certain example embodiments, the support frame 106 may be positioned at least partially within the seat shell 104 and at least partially within the base 102. As shown, the support frame 106 may include an upper frame portion that supports an upper portion of the seat shell 104, and a lower frame portion that supports a lower portion of the seat shell 104. The car seat 100 may include one or more belt paths configured for receiving a vehicle seat belt to secure the car seat to a vehicle seat. In particular, the car seat 100 may include a forward-facing belt path configured for receiving the vehicle seat belt when the car seat 100 is installed in the forward-facing mode, and a rear-facing belt path configured for receiving the vehicle seat belt when the car seat 100 is installed in the rear-facing mode. The one or more belt paths may be positioned along the support frame 106 of the car seat 100. In certain example embodiments, the support frame 106 may extend between the forward-facing belt path and the rear-facing belt path. The car seat 100 also may include a number of harness points configured for attaching a harness thereto. During use, the harness may extend over a child positioned in the seat shell 104 and attach to the harness points to securely restrain the child within the seat shell 104. In certain example embodiments, the support frame 106 of the car seat 100 may connect the number of harness points. In other words, the support frame 106 may extend between the number of harness points such that the base 102 carries and distributes loads applied to the harness during use of the car seat 100.

The support frame 106 may include a first frame portion 110 (which also may be referred to as a "first portion," an "upper frame portion," a "first tube portion," a "first assembly," a "first frame assembly," or a "first tube assembly") and a second frame portion 112 (which also may be referred to as a "second portion," a "lower frame portion," a "second tube portion," a "second assembly," a "second frame assembly," or a "second tube assembly") attached, either removably or permanently, to the first frame portion 110 at one or more joint connections 114 (which also may be referred to simply as "joints"), as shown in FIGS. 1A-1D. For example, the first frame portion 110 and the second frame portion 112 may be attached to one another at two joint connections 114A, 114B, although any number of joint connections 114 may be used. In certain example embodiments, the seat shell 104 may be mounted to the first frame portion 110, the second frame portion 112, or both the first frame portion 110 and the second frame portion 112.

As shown in FIGS. 1A-1E, the first frame portion 110 may include one or more side supports 116 (which also may be referred to as "side tubes," "side support tubes," or simply "supports"). For example, according to the illustrated embodiment, the first frame portion 110 may include a first side support 116A positioned along a first lateral side of the car seat 100, and a second side support 116B positioned along a second lateral side of the car seat 100. In other example embodiments, the first frame portion 110 may include a single support 116 positioned centrally between the first and second lateral sides of the car seat 100. As shown, the side supports 116A, 116B may be spaced apart from one another and may be parallel or substantially parallel to one another. In certain example embodiments, the first frame portion 110 also may include one or more cross members each extending from the first side support 116A to the second side support 116B. In certain example embodiments, as shown, the side supports 116A, 116B each may be formed as tubular members having a hollow interior. According to such embodiments, the side supports 116A, 116B each may have a rectangular cross-sectional shape or a square cross-sectional shape, although other cross-sectional shapes may be used. In other example embodiments, one or both of the side supports 116A, 116B may be formed as solid or substantially solid members, such as plates or bars. The side supports 116A, 116B each may be contoured and may include one or more curved portions and one or more straight portions, as shown in FIGS. 1A-1E, although other contours and shapes of the side supports 116A, 116B may be used. As shown, the side supports 116A, 116B may include one or more apertures 120 defined therein and extending through one or more walls of the side supports 116A, 116B. One or more of the apertures 120 may be used to facilitate attachment of the second frame portion 112 to the first frame portion 110, as described below, attachment of the seat shell 104 to the first frame portion 110, and/or attachment of other components of the car seat 100 to the first frame portion 110. In certain example embodiments, the side supports 116A, 116B each may have a cross-sectional area and/or a wall thickness that remains constant or substantially constant along the length of the respective side support 116A, 116B. In other example embodiments, the side supports 116A, 116B each may have a cross-sectional area and/or a wall thickness that varies along the length of the respective side support 116A, 116B.

In a similar manner, as shown in FIGS. 1A-1D and 1F, the second frame portion 112 may include one or more side supports 122 (which also may be referred to as "side tubes," "side support tubes," or simply "supports"). For example, according to the illustrated embodiment, the second frame portion 112 may include a first side support 122A positioned along the first lateral side of the car seat 100, and a second side support 122B positioned along the second lateral side of the car seat 100. In other example embodiments, the second frame portion 112 may include a single support 122 positioned centrally between the first and second lateral sides of the car seat 100. As shown, the side supports 122A, 122B may be spaced apart from one another and may be parallel or substantially parallel to one another. In certain example embodiments, the second frame portion 112 also may include one or more cross members each extending from the first side support 122A to the second side support 122B. In certain example embodiments, as shown, the side supports 122A, 122B each may be formed as tubular members having a hollow interior. According to such embodiments, the side supports 122A, 122B each may have a rectangular cross-sectional shape or a square cross-sectional shape, although other cross-sectional shapes may be used. In other example embodiments, one or both of the side supports 122A, 122B may be formed as solid or substantially solid members, such as plates or bars. The side supports 122A, 122B each may be contoured and may include one or more curved portions and one or more straight portions, as shown in FIGS. 1A-1D and 1F, although other contours and shapes of the side supports 122A, 122B may be used. As shown, the side supports 122A, 122B may include one or more apertures 126 defined therein and extending through one or more walls of the side supports 122A, 122B. One or more of the apertures 126 may be used to facilitate attachment of the first frame portion 110 to the second frame portion 112, as described below, attachment of the seat shell 104 to the second frame portion 112, and/or attachment of other components of the car seat 100 to the second frame portion 112. In certain example embodiments, the side supports 122A, 122B each may have a cross-sectional area and/or a wall thickness that remains constant or substantially constant along the length of the respective side support 122A, 122B. In other example embodiments, the side supports 122A, 122B each may have a cross-sectional area and/or a wall thickness that varies along the length of the respective side support 122A, 122B.

In certain example embodiments, the seat shell 104 may include one or more intermediate members that extend from the first side support 116A to the second side support 116B of the first frame portion 110 and from the first side support 122A to the second side support 122B of the second frame portion 112. In other example embodiments, the base 102 may include one or more intermediate members that extend from the first side support 116A to the second side support 116B of the first frame portion 110 and from the first side support 122A to the second side support 122B of the second frame portion 112.

As shown in FIGS. 1A-1D, the joint connections 114A, 114B between the first frame portion 110 and the second frame portion 112 may be formed between respective end portions of the side supports 116A, 116B of the first frame portion 110 and respective ends of the side supports 122A, 122B of the second frame portion 112. In certain example embodiments, as shown, each of the side supports 122A, 122B may have a cross-sectional area that is less than a cross-sectional area of the respective side supports 116A, 116B, and respective end portions of the side supports 122A, 122B may be positioned within respective end portions of the side supports 116A, 116B to form the joint connections 114A, 114B. Additionally, as shown, the respective end portions of the side supports 122A, 122B may be attached to the respective end portions of the side supports 116A, 116B by one or more fasteners 128, such as bolts, screws, rivets, or pins, although other connection mechanisms may be used. The fasteners 128 may be received within and extend through respective apertures 120, 126 of the side supports 116A, 116B, 122A, 122B, as shown. The fasteners 128 may be removable or may be permanently attached to one or both of the respective side supports 116A, 116B, 122A, 122B. Alternatively, the respective ends of the side supports 116A, 116B of the first frame portion 110 and the respective ends of the side supports 122A, 122B of the second frame portion 112 may be welded to one another or otherwise permanently attached by other means of attachment. In certain example embodiments, as shown, a cross-sectional shape of the side supports 122A, 122B may be the same as a cross-sectional shape of the side supports 116A, 116B, although different cross-sectional shapes may be used in other embodiments. It will be appreciated that the illustrated embodiment provides merely one example of the joint connections 114A, 114B between the first frame portion 110 and the second frame portion 112, and that other suitable configurations of the joint connections 114A, 114B may be used.

In certain example embodiments, a stiffness of each of the side supports 116A, 116B of the first frame portion 110 may be different than a stiffness of each of the side supports 122A, 122B of the second frame portion 112. In particular, the stiffness of each of the side supports 116A, 116B of the first frame portion 110 may be greater than the stiffness of each of the side supports 122A, 122B of the second frame portion 112. In this manner, the side supports 122A, 122B of the second frame portion 112 may deform more readily than the side supports 116A, 116B of the first frame portion 110, when subjected to a same or similar load. This relative stiffness relationship advantageously may allow the frame 106 to be configured for optimizing energy management during both forward-facing and rear-facing crash events. In particular, the more stiff side supports 116A, 116B of the first frame portion 110, which may be subjected to high loads during a front-facing crash event, may prevent or inhibit deformation of the side supports 116A, 116B of the first frame portion 110 during such a crash event. Accordingly, the first frame portion 110 may maintain its original shape during a front-facing crash event, such that the car seat 100 may pass regulated excursion limits. In contrast, the less stiff side supports 122A, 122B of the second frame portion 112, which may be subjected to high loads during a rear-facing crash event, may allow for controlled deformation of the side supports 122A, 122B of the second frame portion 112 during such a crash event. Accordingly, the second frame portion 112 may controllably deform from its original shape to a deformed shape during a rear-facing crash event to dissipate the crash energy over a longer period of time.

Figure 1G:
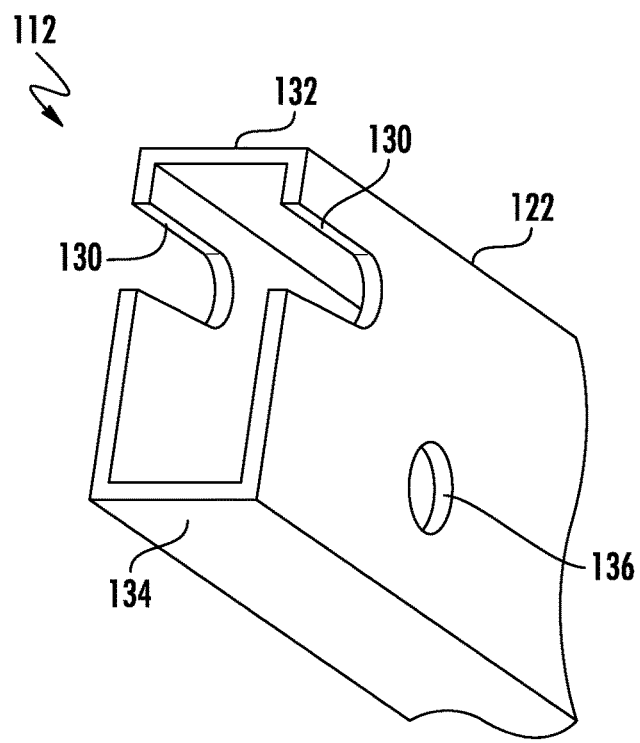
FIG. 1G is a detailed perspective view of an end portion of a side support of the second frame portion of the frame of the car seat of FIG. 1A.
Figure 1H:
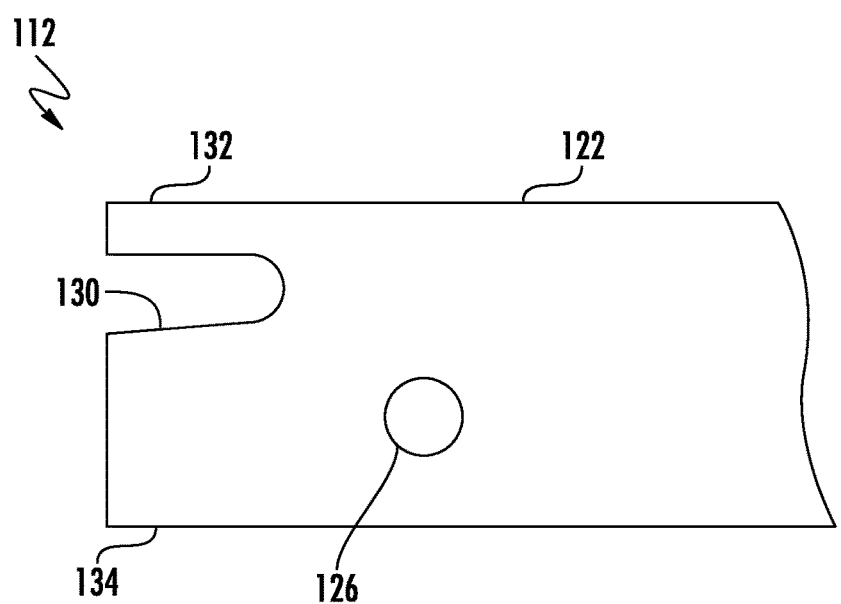
FIG. 1H is a detailed side view of the end portion of the side support of the second frame portion of the frame of the car seat of FIG. 1A.

The relative stiffness relationship between the side supports 116A, 116B of the first frame portion 110 and the side supports 122A, 122B of the second frame portion 112 may be achieved in a number of different ways. In certain example embodiments, each of the side supports 122A, 122B may have a cross-sectional area that is less than a cross-sectional area of the respective side supports 116A, 116B. In certain example embodiments, each of the side supports 122A, 122B may have a wall thickness that is less than a wall thickness of the respective side supports 116A, 116B. In certain example embodiments, each of the side supports 122A, 122B may be formed of a material having a stiffness that is less than a stiffness of a material of the respective side supports 116A, 116B. For example, the side supports 122A, 122B may be formed of aluminum, and the side supports 116A, 116B may be formed of steel, although other suitable materials may be used. In certain example embodiments, each of the side supports 122A, 122B may include one or more slots, holes, indents, or other negative features defined therein and configured for decreasing a stiffness of the side supports 122A, 122B at or along one or more portions of the side supports 122A, 122B. For example, as shown in FIGS. 1G and 1H, the end portions of the side supports 122A, 122B may include one or more slots 130 extending through sidewalls of the side supports 122A, 122B. In particular, the slots 130 may be defined between a first region 132 and a second region 134 of the end portion of the respective side support 122A, 122B. Depending on the positioning of the slots 130 and the size and shape of the regions 132, 134, during a rear-facing crash event, the first region 132 may controllably deform toward the second region 134, the second region 134 may controllably deform toward the first region 132, or both regions 132, 134 may controllably deform toward one another.

It will be appreciated that the relative stiffness relationship between the side supports 116A, 116B of the first frame portion 110 and the side supports 122A, 122B of the second frame portion 112 may be achieved by providing different cross-sectional areas of the side supports 116A, 116B, 122A, 122B, by providing different wall thicknesses of the side supports 116A, 116B, 122A, 122B, by forming the side supports 116A, 116B from a different material than the side supports 122A, 122B, by providing negative features defined in the side supports 122A, 122B, by providing the side supports 122A, 122B with other features or characteristics different than the side supports 116A, 116B such that the stiffness of each of the side supports 116A, 116B is greater than the stiffness of each of the side supports 122A, 122B, or any combination of these or other attributes. Ultimately, the relative stiffness relationship between the side supports 116A, 116B and the side supports 122A, 122B may prevent or inhibit deformation of the first frame portion 110 during such a forward-facing crash event, and may allow for controlled deformation of the second frame portion 112 during such a rear-facing crash event. It will be appreciated that the second frame portion 112 may be configured to allow for such controlled deformation at or along any predetermined portion of the second frame portion 112. Although the illustrated embodiment of the second frame portion 112 allows for such controlled deformation at the end portions of the side supports 122A, 122B, due to the slots 130 defined therein, other embodiments of the second frame portion 112 may allow for controlled deformation at or along other predetermined portions of the side supports 122A, 122B, such as intermediate portions spaced apart from the end portions thereof.

The first frame portion 110 and the second frame portion 112 may be formed of various suitable materials. In certain example embodiments, the first frame portion 110 and the second frame portion 112 each may be formed of steel. In other example embodiments, the first frame portion 110 may be formed of steel, and the second frame portion 112 may be formed of aluminum. In still other example embodiments, the first frame portion 110 and the second frame portion 112 may be formed of any suitable metal, metal alloy, plastic, composite material, or other material.

In certain example embodiments, the first side support 116A of the first frame portion 110 may be integrally formed with the first side support 122A of the second frame portion 112, and the second side support 116B of the first frame portion 110 may be integrally formed with the second side support 122B of the second frame portion 112. In this manner, the first side support 116A and the first side support 122A may be different regions of a first unitary member, and the second side support 116B and the second side support 122B may be different regions of a second unitary member. In other words, the first side support 116A may be a first or upper region of the first unitary member, the first side support 122A may be a second or lower region of the first unitary member, the second side support 116B may be a first or upper region of the second unitary member, and the second side support 122B may be a second or lower region of the second unitary member. The unitary members each may have a tubular, solid, or substantially solid shape. In some such embodiments, the relative stiffness relationship between the side supports 116A, 116B and the side supports 122A, 122B may be achieved by providing different cross-sectional areas of the side supports 116A, 116B, 122A, 122B (i.e., varying the cross-sectional area along the lengths of the unitary members), by providing different wall thicknesses of the side supports 116A, 116B, 122A, 122B (i.e., varying the wall thickness along the lengths of the unitary members), by providing negative features defined in the side supports 122A, 122B, by providing the side supports 122A, 122B with other features or characteristics different than the side supports 116A, 116B such that the stiffness of each of the side supports 116A, 116B is greater than the stiffness of each of the side supports 122A, 122B, or any combination of these or other attributes. In other such embodiments, the relative stiffness relationship between the side supports 116A, 116B and the side supports 122A, 122B may be achieved by providing additional structural components, such as tubular members, rods, or plates, positioned and mounted within, around, or alongside the side supports 116A, 116B to provide greater stiffness along the first or upper regions of the unitary members as compared to the second or lower regions of the unitary members.

In other example embodiments, the stiffness of each of the side supports 116A, 116B of the first frame portion 110 may be equal to or substantially equal to the stiffness of each of the side supports 122A, 122B of the second frame portion 112. In such embodiments, a stiffness of the first joint connection 114A may be less than the stiffness of the side supports 116A, 122A, and a stiffness of the second joint connection 114B may be less than the stiffness of the side supports 116B, 122B. In this manner, the relative stiffness relationship between the side supports 116A, 122A and the first joint connection 114A may prevent or inhibit deformation of the side supports 116A, 122A during a rear-facing crash event, and may allow for controlled deformation of the first joint connection 114A during such a rear-facing crash event. In a similar manner, the relative stiffness relationship between the side supports 116B, 122B and the second joint connection 114B may prevent or inhibit deformation of the side supports 116B, 122B during a rear-facing crash event, and may allow for controlled deformation of the second joint connection 114B during such a rear-facing crash event. Accordingly, the joint connections 114A, 114B may controllably deform from their original shapes to deformed shapes during a rear-facing crash event to dissipate the crash energy over a longer period of time.

It will be appreciated that the size, shape, materials, and other characteristics of the overall support frame 106 as well as the above-described components and features thereof may be selected such that the support frame 106 is configured for optimizing energy management while satisfying the regulated excursion limits and crash test standards of a particular jurisdiction, which may vary in view of characteristics of the relevant population. In certain example embodiments, the support frame 106 may be configured to satisfy the regulated excursion limits and crash test standards of the United States of America, Europe or particular countries thereof, or any other country, region, state, or local jurisdiction.

FIGS. 2A-2G illustrate a support frame 206 (which also may be referred to as a "structural frame" or simply a "frame") in accordance with one or more embodiments of the disclosure. The support frame 206 may be used, instead of the support frame 106 described above, along with the base 102 and the seat shell 104 for the car seat 100. It will be appreciated that the support frame 206 generally may include components and features similar to those of the support frame 106, and that the support frame 206 generally may function in a manner similar to the support frame 106 to manage energy during a crash event, although certain structural and functional differences are described herein below. Corresponding components and features are indicated by corresponding reference numbers (i.e., reference numbers beginning with a "2" instead of a "1") in the description and the figures. It will be appreciated that the illustrated embodiment of the support frame 206 is merely an example embodiment, and that other embodiments of the support frame 206 may be used for the car seat 100.

The support frame 206 may include a first frame portion 210 (which also may be referred to as a "first portion," an "upper frame portion," a "first tube portion," a "first assembly," a "first frame assembly," or a "first tube assembly") and a second frame portion 212 (which also may be referred to as a "second portion," a "lower frame portion," a "second tube portion," a "second assembly," a "second frame assembly," or a "second tube assembly") attached, either removably or permanently, to the first frame portion 210 at one or more joint connections 214 (which also may be referred to simply as "joints"), as shown in FIGS. 2A-2C, 2F, and 2G. For example, the first frame portion 210 and the second frame portion 212 may be attached to one another at two joint connections 214A, 214B, although any number of joint connections 214 may be used. In certain example embodiments, the seat shell 104 may be mounted to the first frame portion 210, the second frame portion 212, or both the first frame portion 210 and the second frame portion 212.

As shown in FIGS. 2A-2D, the first frame portion 210 may include one or more side supports 216 (which also may be referred to as "side tubes," "side support tubes," or simply "supports"). For example, according to the illustrated embodiment, the first frame portion 210 may include a first side support 216A positioned along a first lateral side of the car seat 100, and a second side support 216B positioned along a second lateral side of the car seat 100. In other example embodiments, the first frame portion 210 may include a single support 216 positioned centrally between the first and second lateral sides of the car seat 100. As shown, the side supports 216A, 216B may be spaced apart from one another and may be parallel or substantially parallel to one another. In certain example embodiments, the first frame portion 210 also may include one or more cross members each extending from the first side support 216A to the second side support 216B. In certain example embodiments, as shown, the side supports 216A, 216B each may be formed as tubular members having a hollow interior. According to such embodiments, the side supports 216A, 216B each may have a rectangular cross-sectional shape or a square cross-sectional shape, although other cross-sectional shapes may be used. In other example embodiments, one or both of the side supports 216A, 216B may be formed as solid or substantially solid members, such as plates or bars. The side supports 216A, 216B each may be contoured and may include one or more curved portions and one or more straight portions, as shown in FIGS. 2A-2D, although other contours and shapes of the side supports 216A, 216B may be used. As shown, the side supports 216A, 216B may include one or more apertures 220 defined therein and extending through one or more walls of the side supports 216A, 216B. One or more of the apertures 220 may be used to facilitate attachment of the second frame portion 212 to the first frame portion 210, as described below, attachment of the seat shell 104 to the first frame portion 210, and/or attachment of other components of the car seat 100 to the first frame portion 210. In certain example embodiments, the side supports 216A, 216B each may have a cross-sectional area and/or a wall thickness that remains constant or substantially constant along the length of the respective side support 216A, 216B. In other example embodiments, the side supports 216A, 216B each may have a cross-sectional area and/or a wall thickness that varies along the length of the respective side support 216A, 216B.

In a similar manner, as shown in FIGS. 2A-2C and 2E, the second frame portion 212 may include one or more side supports 222 (which also may be referred to as "side tubes," "side support tubes," or simply "supports"). For example, according to the illustrated embodiment, the second frame portion 212 may include a first side support 222A positioned along the first lateral side of the car seat 100, and a second side support 222B positioned along the second lateral side of the car seat 100. In other example embodiments, the second frame portion 212 may include a single support 222 positioned centrally between the first and second lateral sides of the car seat 100. As shown, the side supports 222A, 222B may be spaced apart from one another and may be parallel or substantially parallel to one another. In certain example embodiments, the second frame portion 212 also may include one or more cross members each extending from the first side support 222A to the second side support 222B. In certain example embodiments, as shown, the side supports 222A, 222B each may be formed as tubular members having a hollow interior. According to such embodiments, the side supports 222A, 222B each may have a rectangular cross-sectional shape or a square cross-sectional shape, although other cross-sectional shapes may be used. In other example embodiments, one or both of the side supports 222A, 222B may be formed as solid or substantially solid members, such as plates or bars. The side supports 222A, 222B each may be contoured and may include one or more curved portions and one or more straight portions, as shown in FIGS. 2A-2C and 2E, although other contours and shapes of the side supports 222A, 222B may be used. As shown, the side supports 222A, 222B may include one or more apertures 226 defined therein and extending through one or more walls of the side supports 222A, 222B. One or more of the apertures 226 may be used to facilitate attachment of the first frame portion 210 to the second frame portion 212, as described below, attachment of the seat shell 104 to the second frame portion 212, and/or attachment of other components of the car seat 100 to the second frame portion 212. In certain example embodiments, the side supports 222A, 222B each may have a cross-sectional area and/or a wall thickness that remains constant or substantially constant along the length of the respective side support 222A, 222B. In other example embodiments, the side supports 222A, 222B each may have a cross-sectional area and/or a wall thickness that varies along the length of the respective side support 222A, 222B.

In certain example embodiments, the seat shell 104 may include one or more intermediate members that extend from the first side support 216A to the second side support 216B of the first frame portion 210 and from the first side support 222A to the second side support 222B of the second frame portion 212. In other example embodiments, the base 102 may include one or more intermediate members that extend from the first side support 216A to the second side support 216B of the first frame portion 210 and from the first side support 222A to the second side support 222B of the second frame portion 212.

As shown in FIGS. 2A-2C, 2F, and 2G, the joint connections 214A, 214B between the first frame portion 210 and the second frame portion 212 may be formed between respective end portions of the side supports 216A, 216B of the first frame portion 210 and respective end portions of the side supports 222A, 222B of the second frame portion 212. In certain example embodiments, as shown, each of the side supports 222A, 222B may have a cross-sectional area that is less than a cross-sectional area of the respective side supports 216A, 216B, and respective end portions of the side supports 222A, 222B may be positioned within respective end portions of the side supports 216A, 216B to form the joint connections 214A, 214B. Additionally, as shown, the respective end portions of the side supports 222A, 222B may be attached to the respective end portions of the side supports 216A, 216B by one or more fasteners 228, such as bolts, screws, rivets, or pins, although other connection mechanisms may be used. The fasteners 228 may be received within and extend through respective apertures 220, 226 of the side supports 216A, 216B, 222A, 222B, as shown. The fasteners 228 may be removable or may be permanently attached to one or both of the respective side supports 216A, 216B, 222A, 222B. Alternatively, the respective ends of the side supports 216A, 216B of the first frame portion 210 and the respective ends of the side supports 222A, 222B of the second frame portion 212 may be welded to one another or otherwise permanently attached by other means of attachment. In certain example embodiments, as shown, a cross-sectional shape of the side supports 222A, 222B may be the same as a cross-sectional shape of the side supports 216A, 216B, although different cross-sectional shapes may be used in other embodiments. It will be appreciated that the illustrated embodiment provides merely one example of the joint connections 214A, 214B between the first frame portion 210 and the second frame portion 212, and that other suitable configurations of the joint connections 214A, 214B may be used.

In certain example embodiments, a stiffness of each of the side supports 216A, 216B of the first frame portion 210 may be equal to or substantially equal to a stiffness of each of the side supports 222A, 222B of the second frame portion 212. In this manner, the side supports 216A, 216B of the first frame portion 210 may deform at a same or similar rate as the side supports 222A, 222B of the second frame portion 212, when subjected to a same or similar load. In other example embodiments, the stiffness of each of the side supports 216A, 216B of the first frame portion 210 may be different than the stiffness of each of the side supports 222A, 222B of the second frame portion 212. In particular, the stiffness of each of the side supports 216A, 216B of the first frame portion 210 may be greater than the stiffness of each of the side supports 222A, 222B of the second frame portion 212. In this manner, the side supports 222A, 222B of the second frame portion 212 may deform more readily than the side supports 216A, 216B of the first frame portion 210, when subjected to a same or similar load.

Figure 2A:
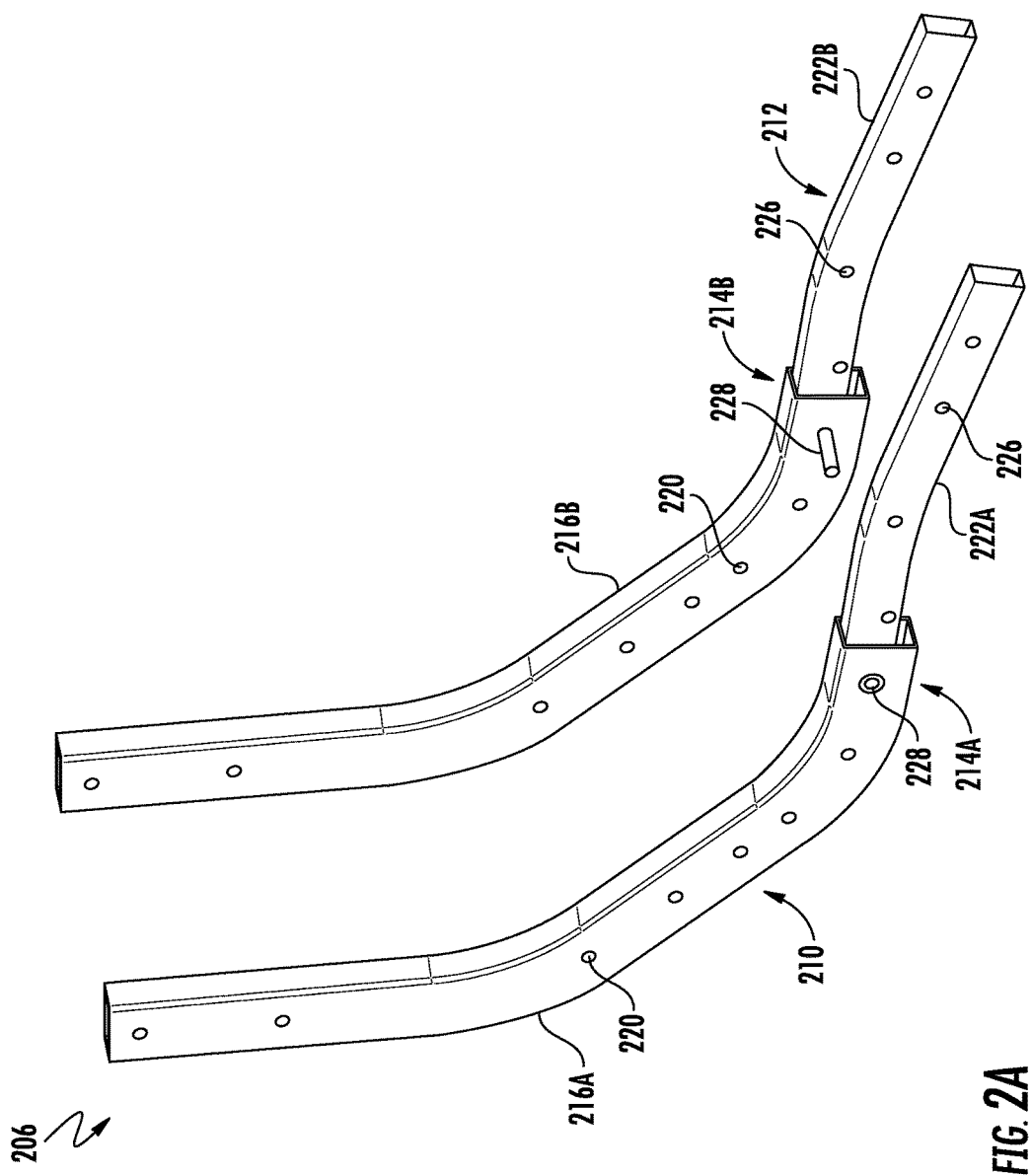
FIG. 2A is a perspective view of a frame of a car seat in accordance with one or more embodiments of the disclosure.
Figure 2C:
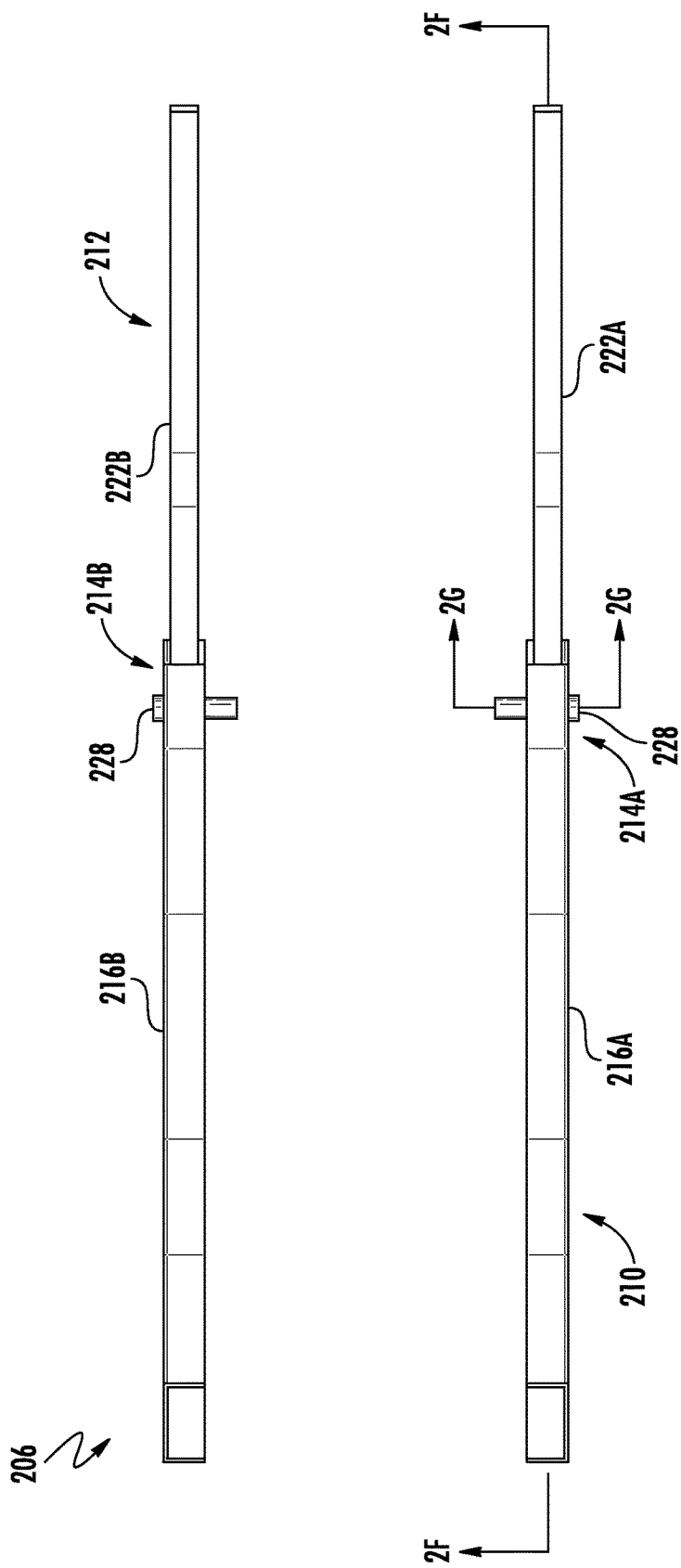
FIG. 2C is a top view of the frame of FIG. 2A.
Figure 2E:
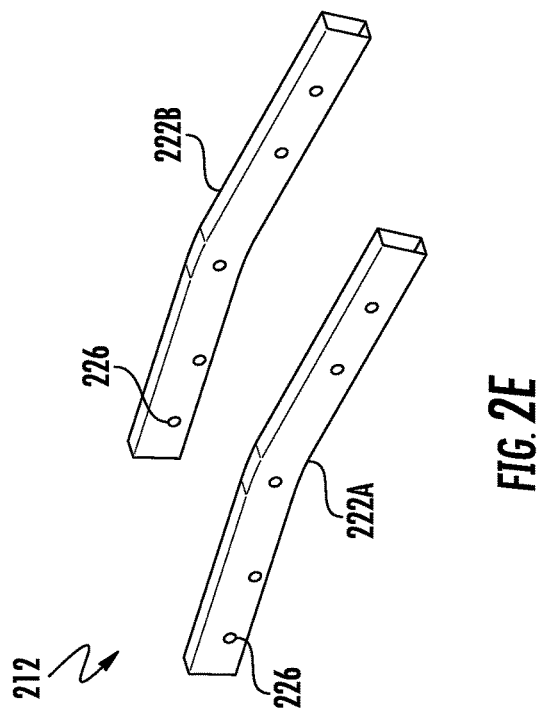
FIG. 2E is a perspective view of a second frame portion of the frame of FIG. 2A.
Figure 2D:
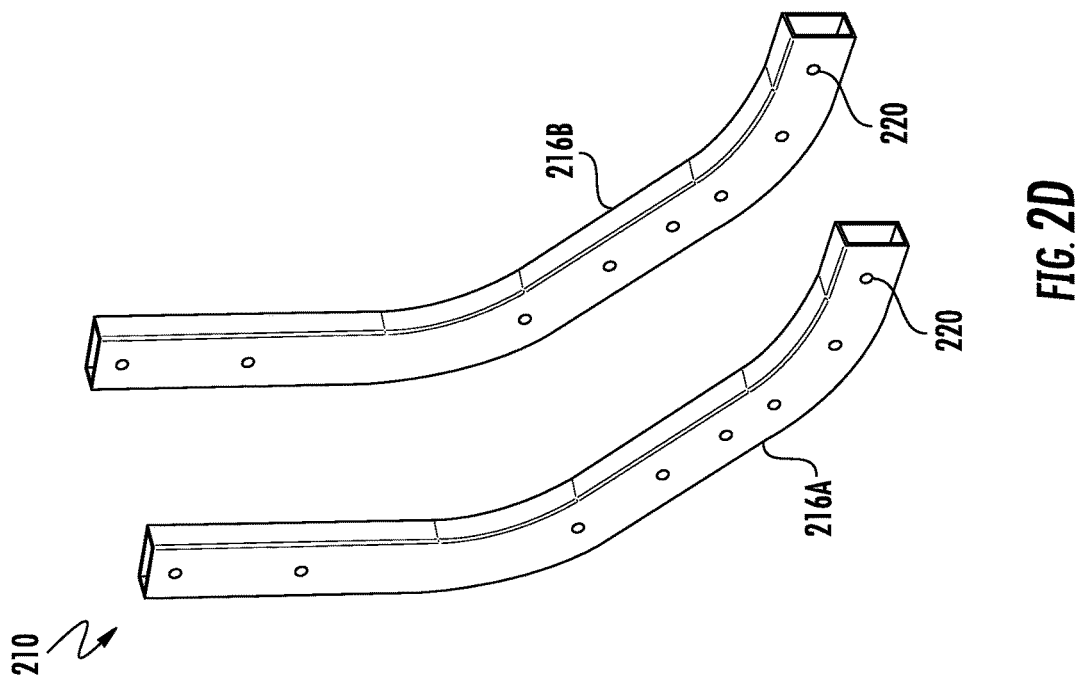
FIG. 2D is a perspective view of a first frame portion of the frame of FIG. 2A.
Figure 2F:
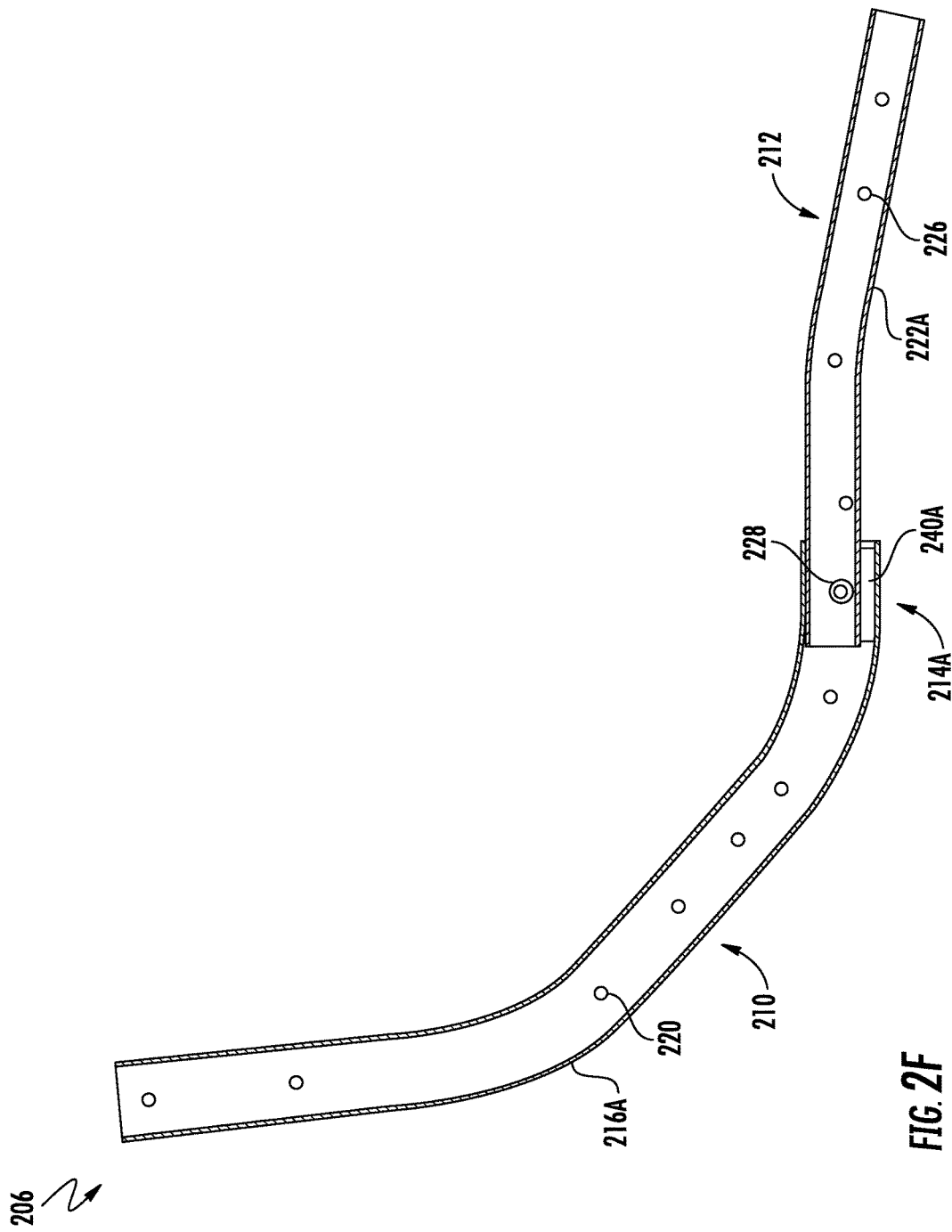
FIG. 2F is a cross-sectional side view of the frame of FIG. 2A, taken along line 2F-2F of FIG. 2C.
Figure 2G:
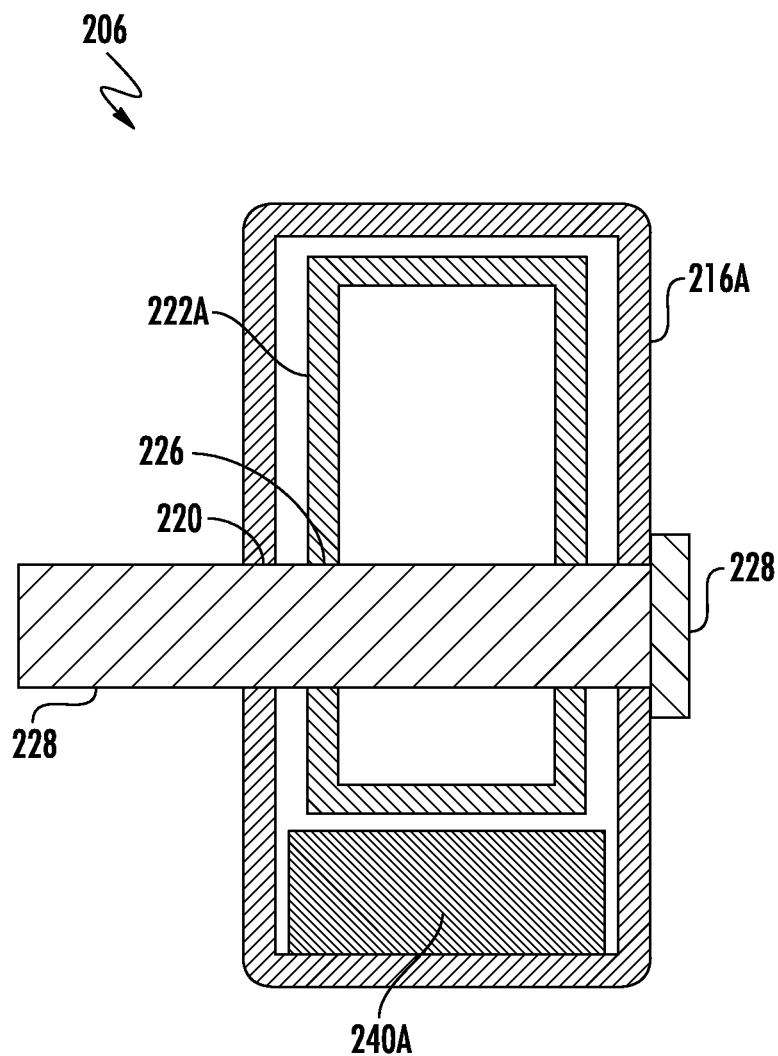
FIG. 2G is a detailed cross-sectional end view of a portion of the frame of FIG. 2A, taken along line 2G-2G of FIG. 2C.
Figure 3A:
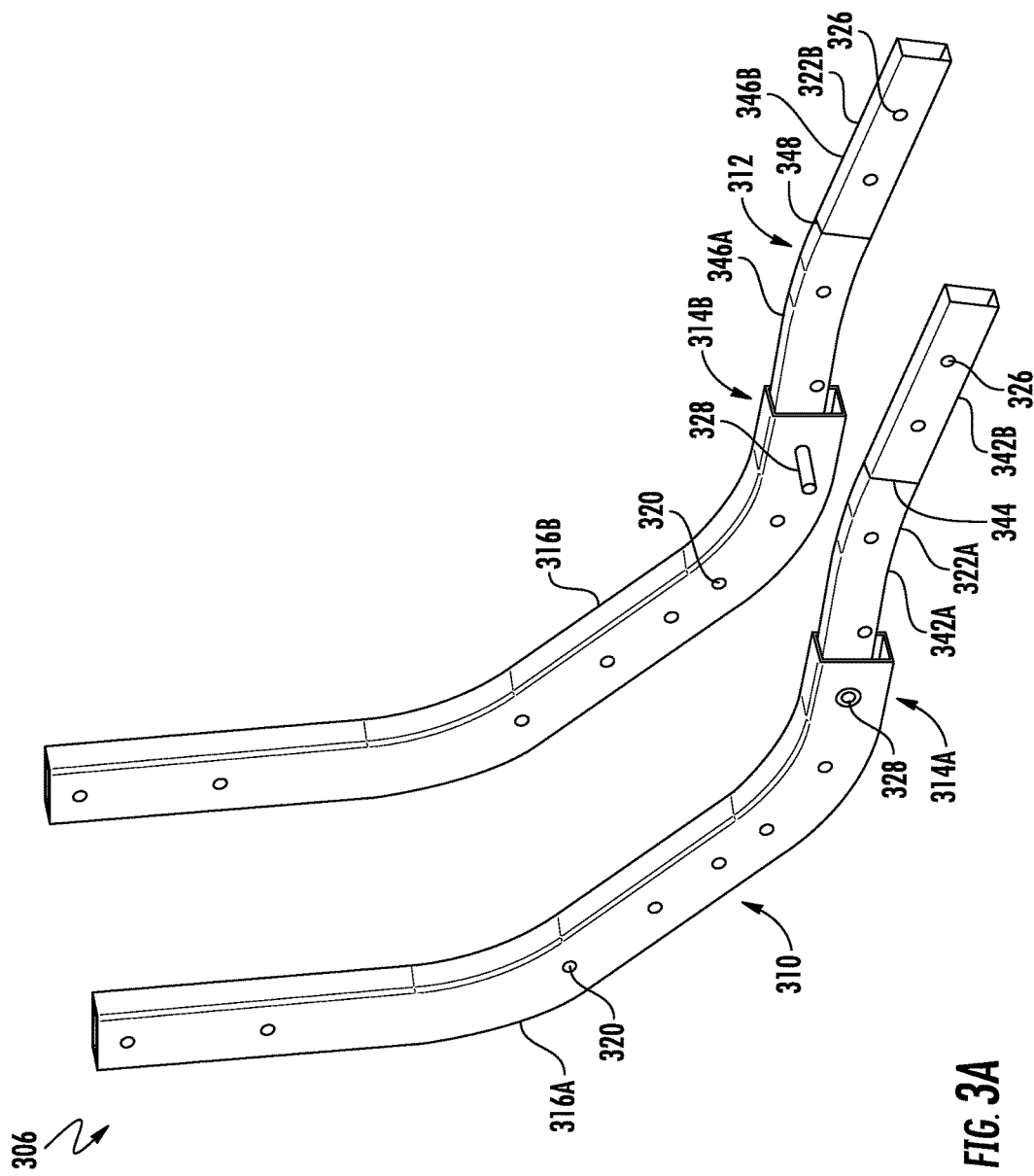
FIG. 3A is a perspective view of a frame of a car seat in accordance with one or more embodiments of the disclosure.
Figure 3C:
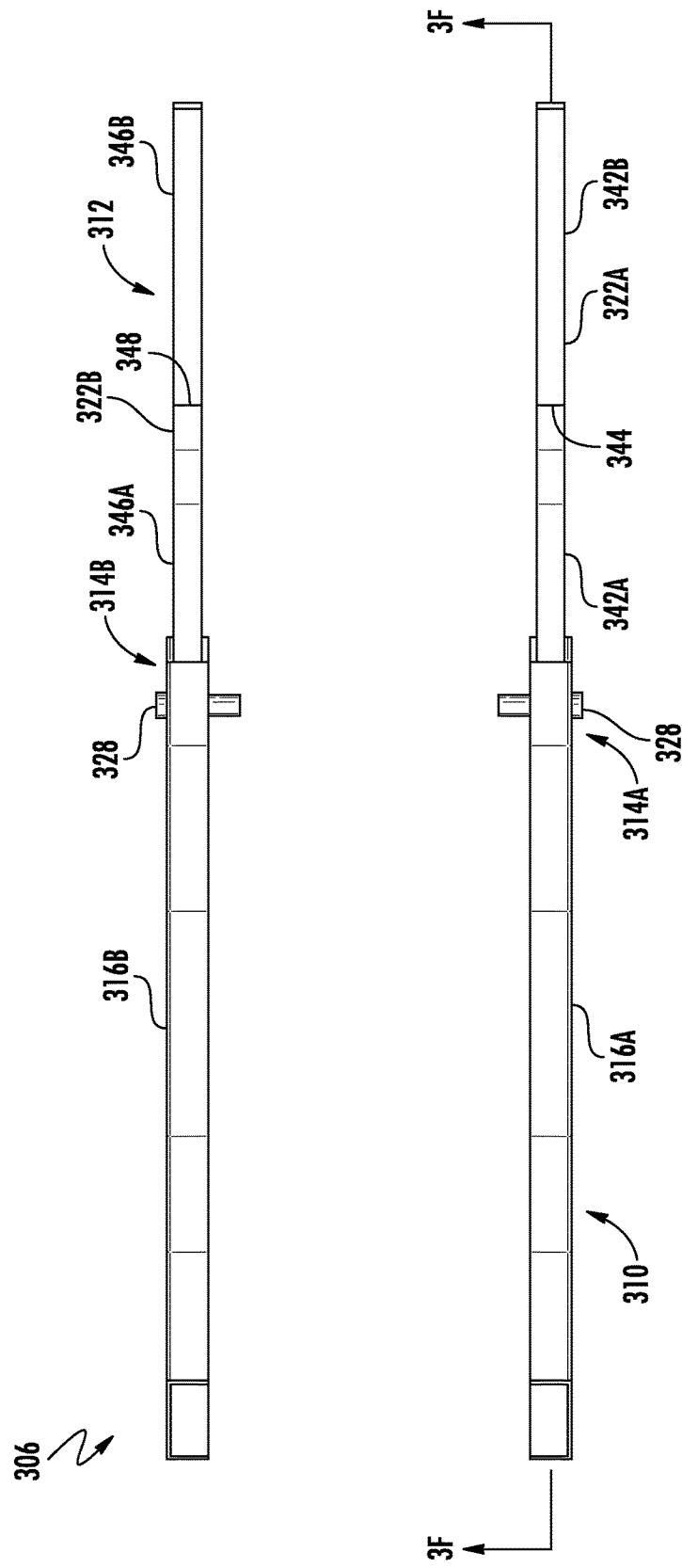
FIG. 3C is a top view of the frame of FIG. 3A.
Figure 3E:
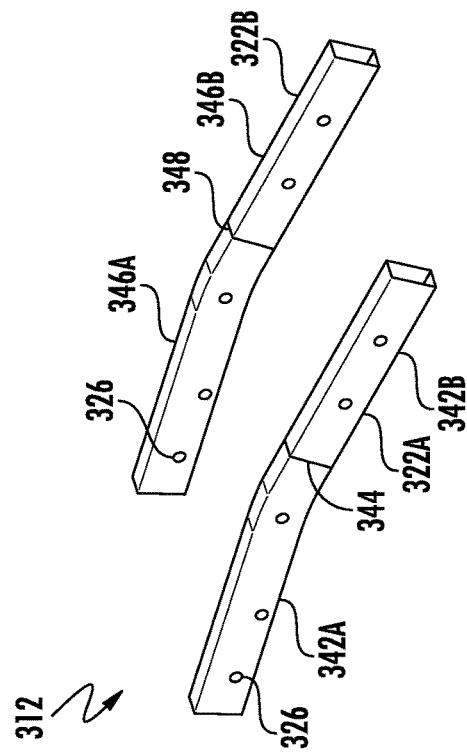
FIG. 3E is a perspective view of a second frame portion of the frame of FIG. 3A.
Figure 3D:
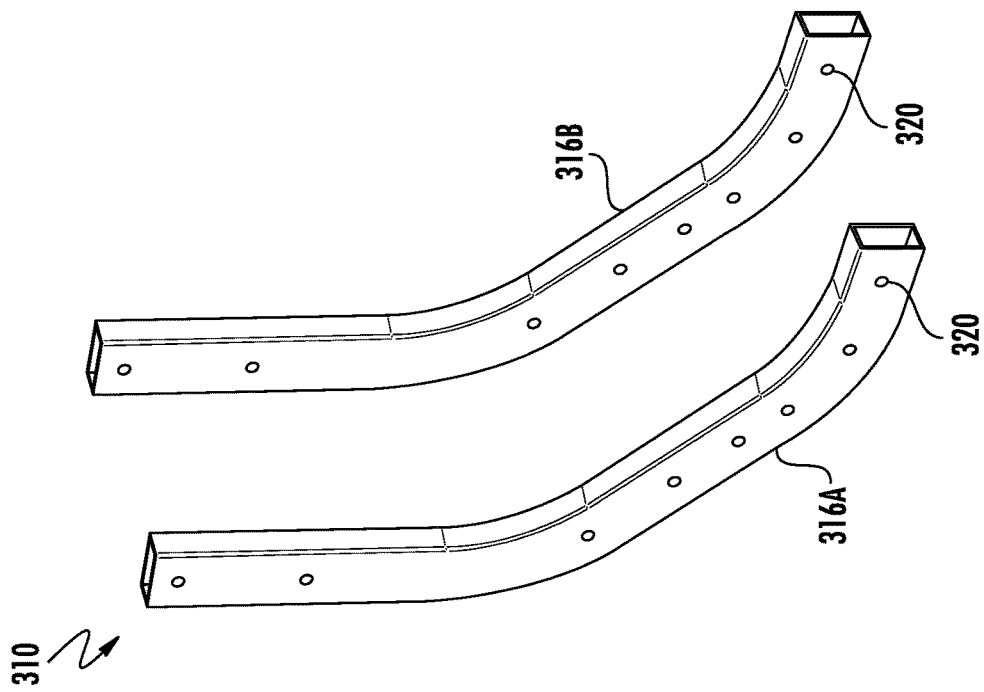
FIG. 3D is a perspective view of a first frame portion of the frame of FIG. 3A.

As shown in FIGS. 2F and 2G, the support frame 206 may include one or more dampening members 240 positioned about the joint connections 214A, 214B and configured to absorb energy during a crash event. In particular, the base 202 may include a first dampening member 240A positioned about the first joint connection 214A and configured to absorb energy carried by the first joint connection 214A during a rear-facing crash event, and a second dampening member 240B positioned about the second joint connection 214B and configured to absorb energy carried by the second joint connection 214B during a rear-facing crash event. In certain example embodiments, as shown, the first dampening member 240A may be positioned within the end portion of the first side support 216A of the first frame portion 210 and below the end portion of the first side support 222A of the second frame portion 212, and the second dampening member 240B may be positioned within the end portion of the second side support 216B of the first frame portion 210 and below the end portion of the second side support 222B of the second frame portion 212. It will be appreciated that other positions of the dampening members 240A, 240B relative to the side supports 216A, 216B of the first frame portion 210 and the side supports 222A, 222B of the second frame portion 212 may be used in which the dampening members 240A, 240B are configured to absorb energy about the joint connections 214A, 214B during a crash event. In certain example embodiments, as shown, the dampening members 240A, 240B may formed as solid or substantially solid blocks, although other suitable shapes and configurations of the dampening members 240A, 240B may be used. In other example embodiments, the dampening members 240A, 240B may be formed as porous members or otherwise may include one or more apertures, slots, voids, or other negative features which may facilitate absorption of energy during a crash event. In certain example embodiments, the dampening members 240A, 240B may be formed of a metal, a metal alloy, a plastic, a composite material, a foam material, an elastic material, another suitable material, or combinations thereof.

In certain example embodiments in which the stiffness of each of the side supports 216A, 216B of the first frame portion 210 is equal to or substantially equal to the stiffness of each of the side supports 222A, 222B of the second frame portion 212, the dampening members 240A, 240B advantageously may allow the base 202 to be configured for optimizing energy management during both forward-facing and rear-facing crash events. In particular, the stiff side supports 216A, 216B of the first frame portion 210, which may be subjected to high loads during a front-facing crash event, may prevent or inhibit deformation of the side supports 216A, 216B of the first frame portion 210 during such a crash event. Accordingly, the first frame portion 210 may maintain its original shape during a front-facing crash event, such that the car seat 200 may pass regulated excursion limits. The stiff side supports 222A, 222B of the second frame portion 212, which may be subjected to high loads during a rear-facing crash event, may prevent or inhibit deformation of the side supports 222A, 222B of the second frame portion 212 during such as crash event. Meanwhile, the dampening members 240A, 240B, which also may be subjected to high loads during a rear-facing crash event, may allow for controlled deformation, either in an elastic or a plastic manner, of the dampening members 240A, 240B during such a crash event. Accordingly, the dampening members 240A, 240B may controllably deform from their original shape to a deformed shape during a rear-facing crash event to dissipate the crash energy over a longer period of time.

In certain example embodiments in which the stiffness of each of the side supports 216A, 216B of the first frame portion 210 is greater than the stiffness of each of the side supports 222A, 222B of the second frame portion 212, the relative stiffness relationship and the dampening members 240A, 240B advantageously may allow the support frame 206 to be configured for optimizing energy management during both forward-facing and rear-facing crash events. In particular, the more stiff side supports 216A, 216B of the first frame portion 210, which may be subjected to high loads during a front-facing crash event, may prevent or inhibit deformation of the side supports 216A, 216B of the first frame portion 210 during such a crash event. Accordingly, the first frame portion 210 may maintain its original shape during a front-facing crash event, such that the car seat 200 may pass regulated excursion limits. The less stiff side supports 222A, 222B of the second frame portion 212, which may be subjected to high loads during a rear-facing crash event, may allow for controlled deformation of the side supports 222A, 222B of the second frame portion 212 during such as crash event. Meanwhile, the dampening members 240A, 240B, which also may be subjected to high loads during a rear-facing crash event, may allow for controlled deformation, either in an elastic or a plastic manner, of the dampening members 240A, 240B during such a crash event. Accordingly, the second frame portion 212 may controllably deform from its original shape to a deformed shape and the dampening members 240A, 240B may controllably deform from their original shape to a deformed shape during a rear-facing crash event to dissipate the crash energy over a longer period of time.

The first frame portion 210 and the second frame portion 212 may be formed of various suitable materials. In certain example embodiments, the first frame portion 210 and the second frame portion 212 each may be formed of steel. In other example embodiments, the first frame portion 210 may be formed of steel, and the second frame portion 212 may be formed of aluminum. In still other example embodiments, the first frame portion 210 and the second frame portion 212 may be formed of any suitable metal, metal alloy, plastic, composite material, or other material.

It will be appreciated that the size, shape, materials, and other characteristics of the overall support frame 206 as well as the above-described components and features thereof may be selected such that the support frame 206 is configured for optimizing energy management while satisfying the regulated excursion limits and crash test standards of a particular jurisdiction, which may vary in view of characteristics of the relevant population. In certain example embodiments, the support frame 206 may be configured to satisfy the regulated excursion limits and crash test standards of the United States of America, Europe or particular countries thereof, or any other country, region, state, or local jurisdiction.

FIGS. 3A-3F illustrate a support frame 306 (which also may be referred to as a "structural frame" or simply a "frame") in accordance with one or more embodiments of the disclosure. The support frame 306 may be used, instead of the support frame 106 described above, along with the base 102 and the seat shell 104 for the car seat 100. It will be appreciated that the support frame 306 generally may include components and features similar to those of the support frame 106, and that the support frame 306 generally may function in a manner similar to the support frame 106 to manage energy during a crash event, although certain structural and functional differences are described herein below. Corresponding components and features are indicated by corresponding reference numbers (i.e., reference numbers beginning with a "3" instead of a "1") in the description and the figures. It will be appreciated that the illustrated embodiment of the support frame 306 is merely an example embodiment, and that other embodiments of the support frame 306 may be used for the car seat 100.

The support frame 306 may include a first frame portion 310 (which also may be referred to as a "first portion," an "upper frame portion," a "first tube portion," a "first assembly," a "first frame assembly," or a "first tube assembly") and a second frame portion 312 (which also may be referred to as a "second portion," a "lower frame portion," a "second tube portion," a "second assembly," a "second frame assembly," or a "second tube assembly") attached, either removably or permanently, to the first frame portion 310 at one or more joint connections 314 (which also may be referred to simply as "joints"), as shown in FIGS. 3A-3C and 3F. For example, the first frame portion 310 and the second frame portion 312 may be attached to one another at two joint connections 314A, 314B, although any number of joint connections 314 may be used. In certain example embodiments, the seat shell 104 may be mounted to the first frame portion 310, the second frame portion 312, or both the first frame portion 310 and the second frame portion 312.

As shown in FIGS. 3A-3D, the first frame portion 310 may include one or more side supports 316 (which also may be referred to as "side tubes," "side support tubes," or simply "supports"). For example, according to the illustrated embodiment, the first frame portion 310 may include a first side support 316A positioned along a first lateral side of the car seat 100, and a second side support 316B positioned along a second lateral side of the car seat 100. In other example embodiments, the first frame portion 310 may include a single support 316 positioned centrally between the first and second lateral sides of the car seat 100. As shown, the side supports 316A, 316B may be spaced apart from one another and may be parallel or substantially parallel to one another. In certain example embodiments, the first frame portion 310 also may include one or more cross members each extending from the first side support 316A to the second side support 316B. In certain example embodiments, as shown, the side supports 316A, 316B each may be formed as tubular members having a hollow interior. According to such embodiments, the side supports 316A, 316B each may have a rectangular cross-sectional shape or a square cross-sectional shape, although other cross-sectional shapes may be used. In other example embodiments, one or both of the side supports 316A, 316B may be formed as solid or substantially solid members, such as plates or bars. The side supports 316A, 316B each may be contoured and may include one or more curved portions and one or more straight portions, as shown in FIGS. 3A-3D, although other contours and shapes of the side supports 316A, 316B may be used. As shown, the side supports 316A, 16B may include one or more apertures 320 defined therein and extending through one or more walls of the side supports 316A, 316B. One or more of the apertures 320 may be used to facilitate attachment of the second frame portion 312 to the first frame portion 310, as described below, attachment of the seat shell 104 to the first frame portion 310, and/or attachment of other components of the car seat 100 to the first frame portion 310. In certain example embodiments, the side supports 316A, 316B each may have a cross-sectional area and/or a wall thickness that remains constant or substantially constant along the length of the respective side support 316A, 316B. In other example embodiments, the side supports 316A, 316B each may have a cross-sectional area and/or a wall thickness that varies along the length of the respective side support 316A, 316B.

In a similar manner, as shown in FIGS. 3A-3C and 3E, the second frame portion 312 may include one or more side supports 322 (which also may be referred to as "side tubes," "side support tubes," or simply "supports"). For example, according to the illustrated embodiment, the second frame portion 312 may include a first side support 322A positioned along the first lateral side of the car seat 100, and a second side support 322B positioned along the second lateral side of the car seat 100. In other example embodiments, the second frame portion 312 may include a single support 322 positioned centrally between the first and second lateral sides of the car seat 100. As shown, the side supports 322A, 322B may be spaced apart from one another and may be parallel or substantially parallel to one another. In certain example embodiments, the second frame portion 312 also may include one or more cross members each extending from the first side support 322A to the second side support 322B. In certain example embodiments, as shown, the side supports 322A, 322B each may be formed as tubular members having a hollow interior. According to such embodiments, the side supports 322A, 322B each may have a rectangular cross-sectional shape or a square cross-sectional shape, although other cross-sectional shapes may be used. In other example embodiments, one or both of the side supports 322A, 322B may be formed as solid or substantially solid members, such as plates or bars. The side supports 322A, 322B each may be contoured and may include one or more curved portions and one or more straight portions, as shown in FIGS. 3A-3C and 3E, although other contours and shapes of the side supports 322A, 322B may be used. As shown, the side supports 322A, 322B may include one or more apertures 326 defined therein and extending through one or more walls of the side supports 322A, 322B. One or more of the apertures 326 may be used to facilitate attachment of the first frame portion 310 to the second frame portion 312, as described below, attachment of the seat shell 104 to the second frame portion 312, and/or attachment of other components of the car seat 100 to the second frame portion 312. In certain example embodiments, the side supports 322A, 322B each may have a cross-sectional area and/or a wall thickness that remains constant or substantially constant along the length of the respective side support 322A, 322B. In other example embodiments, the side supports 322A, 322B each may have a cross-sectional area and/or a wall thickness that varies along the length of the respective side support 322A, 322B.

In certain example embodiments, the seat shell 104 may include one or more intermediate members that extend from the first side support 316A to the second side support 316B of the first frame portion 310 and from the first side support 322A to the second side support 322B of the second frame portion 312. In other example embodiments, the base 102 may include one or more intermediate members that extend from the first side support 316A to the second side support 316B of the first frame portion 310 and from the first side support 322A to the second side support 322B of the second frame portion 312.

As shown in FIGS. 3A-3C and 3F, the joint connections 314A, 314B between the first frame portion 310 and the second frame portion 312 may be formed between respective end portions of the side supports 316A, 316B of the first frame portion 310 and respective end portions of the side supports 322A, 322B of the second frame portion 312. In certain example embodiments, as shown, each of the side supports 322A, 322B may have a cross-sectional area that is less than a cross-sectional area of the respective side supports 316A, 316B, and respective end portions of the side supports 322A, 322B may be positioned within respective end portions of the side supports 316A, 316B to form the joint connections 314A, 314B. Additionally, as shown, the respective end portions of the side supports 322A, 322B may be attached to the respective end portions of the side supports 316A, 316B by one or more fasteners 328, such as bolts, screws, rivets, or pins, although other connection mechanisms may be used. The fasteners 328 may be received within and extend through respective apertures 320, 326 of the side supports 316A, 316B, 322A, 322B, as shown. The fasteners 328 may be removable or may be permanently attached to one or both of the respective side supports 316A, 316B, 322A, 322B. Alternatively, the respective ends of the side supports 316A, 316B of the first frame portion 310 and the respective ends of the side supports 322A, 322B of the second frame portion 312 may be welded to one another or otherwise permanently attached by other means of attachment. In certain example embodiments, as shown, a cross-sectional shape of the side supports 322A, 322B may be the same as a cross-sectional shape of the side supports 316A, 316B, although different cross-sectional shapes may be used in other embodiments. It will be appreciated that the illustrated embodiment provides merely one example of the joint connections 314A, 314B between the first frame portion 310 and the second frame portion 312, and that other suitable configurations of the joint connections 314A, 314B may be used.

In certain example embodiments, each of the side supports 322A, 322B of the second frame portion 312 may include two or more portions (which also may be referred to as "sections") attached to one another to form the respective side support 322A, 322B. For example, as shown in FIGS. 3A-3C, 3E, and 3F, the first side support 322A may include a first portion 342A attached to a second portion 342B at a joint 344, and the second side support 322B may include a first portion 346A attached to a second portion 346B at a joint 348. In certain example embodiments, the first portion 342A and the second portion 342B of the first side support 322A may be integrally formed with one another at the joint 344, and the first portion 346A and the second portion 346B of the second side support 322B may be integrally formed with one another at the joint 348. In other example embodiments, the first portion 342A and the second portion 342B of the first side support 322A may be separately formed and fixedly attached to one another at the joint 344, such as by welding, and the first portion 346A and the second portion 346B of the second side support 322B may be separately formed and fixedly attached to one another at the joint 348, such as by welding. In still other example embodiments, the first portion 342A and the second portion 342B of the first side support 322A may be separately formed and attached to one another at the joint 344 by one or more fasteners, such as bolts, screws, rivets, or pins, and the first portion 346A and the second portion 346B of the second side support 322B may be separately formed and attached to one another at the joint 348 by one or more fasteners, such as bolts, screws, rivets, or pins. Still other means of attachment may be used for attaching the portions 342A, 342B of the first side support 322A and the portions 346A, 346B of the second side support 322B in other embodiments. Although the illustrated embodiment shows the first side support 322A as including two portions 342A, 342B attached to one another at the joint 344 and the second side support 322B as including two portions 346A, 346B attached to one another at the joint 348, it will be appreciated that each of the side supports 322A, 322B may include any number of portions 342, 346 attached to one another at any number of joints 344, 348 in other embodiments.

A stiffness of the side supports 316A, 316B of the first frame portion 310 may be different than a stiffness of at least a portion of each of the side supports 322A, 322B of the second frame portion 312. In particular, the stiffness of each of the side supports 316A, 316B of the first frame portion 310 may be greater than the stiffness of at least a portion of each of the side supports 322A, 322B of the second frame portion 312. In this manner, the side supports 322A, 322B of the second frame portion 312 may deform more readily than the side supports 316A, 316B of the first frame portion 310, when subjected to a same or similar load. This relative stiffness relationship advantageously may allow the support frame 306 to be configured for optimizing energy management during both forward-facing and rear-facing crash events. In particular, the more stiff side supports 316A, 316B of the first frame portion 310, which may be subjected to high loads during a front-facing crash event, may prevent or inhibit deformation of the side supports 316A, 316B of the first frame portion 310 during such a crash event. Accordingly, the first frame portion 310 may maintain its original shape during a front-facing crash event, such that the car seat 100 may pass regulated excursion limits. In contrast, the less stiff side supports 322A, 322B of the second frame portion 312, which may be subjected to high loads during a rear-facing crash event, may allow for controlled deformation of the side supports 322A, 322B of the second frame portion 312 during such a crash event. Accordingly, the second frame portion 312 may controllably deform from its original shape to a deformed shape during a rear-facing crash event to dissipate the crash energy over a longer period of time.

The relative stiffness relationship between the side supports 316A, 316B of the first frame portion 310 and the side supports 322A, 322B of the second frame portion 312 may be achieved in a number of different ways. In certain example embodiments, each of the side supports 322A, 322B may have a cross-sectional area that is less than a cross-sectional area of the respective side supports 316A, 316B. In certain example embodiments, each of the side supports 322A, 322B may have a wall thickness that is less than a wall thickness of the respective side supports 316A, 316B. In certain example embodiments, each of the side supports 322A, 322B may be formed of a material having a stiffness that is less than a stiffness of a material of the respective side supports 316A, 316B. For example, the side supports 322A, 322B may be formed of aluminum, and the side supports 316A, 316B may be formed of steel, although other suitable materials may be used. In certain example embodiments, each of the side supports 322A, 322B may include one or more slots, holes, indents, or other negative features defined therein and configured for decreasing a stiffness of the side supports 322A, 322B at or along one or more portions of the side supports 322A, 322B.

It will be appreciated that the relative stiffness relationship between the side supports 316A, 316B of the first frame portion 310 and the side supports 322A, 322B of the second frame portion 312 may be achieved by providing different cross-sectional areas of the side supports 316A, 316B, 322A, 322B, by providing different wall thicknesses of the side supports 316A, 316B, 322A, 322B, by forming the side supports 316A, 316B from a different material than the side supports 322A, 322B, by providing negative features defined in the side supports 322A, 322B, by providing the side supports 322A, 322B with other features or characteristics different than the side supports 316A, 316B such that the stiffness of each of the side supports 316A, 316B is greater than the stiffness of each of the side supports 322A, 322B, or any combination of these or other attributes. Ultimately, the relative stiffness relationship between the side supports 316A, 316B and the side supports 322A, 322B may prevent or inhibit deformation of the first frame portion 310 during such a forward-facing crash event, and may allow for controlled deformation of the second frame portion 312 during such a rear-facing crash event. It will be appreciated that the second frame portion 312 may be configured to allow for such controlled deformation at or along any predetermined portion of the second frame portion 312.

The first frame portion 310 and the second frame portion 312 may be formed of various suitable materials. In certain example embodiments, the first frame portion 310 and the second frame portion 312 each may be formed of steel. In other example embodiments, the first frame portion 310 may be formed of steel, and the second frame portion 312 may be formed of aluminum. In still other example embodiments, the first frame portion 310 and the second frame portion 312 may be formed of any suitable metal, metal alloy, plastic, composite material, or other material.

In certain example embodiments in which the first side support 322A includes the two portions 342A, 342B attached at the joint 344 and the second side support 322B includes the two portions 346A, 346B attached at the joint 348, a stiffness of the first portion 342A may be different than a stiffness of the second portion 342B, and a stiffness of the first portion 346A may be different than a stiffness of the second portion 346B. In particular, the stiffness of the first portion 342A may be greater than the stiffness of the second portion 342B, and the stiffness of the first portion 346A may be greater than the stiffness of the second portion 346B. Alternatively, the stiffness of the first portion 342A may be less than the stiffness of the second portion 342B, and the stiffness of the first portion 346A may be less than the stiffness of the second portion 346B. It will be appreciated that the relative stiffness relationship between the first portions 342A, 346B and the respective second portions 342B, 346B may be achieved by providing different cross-sectional areas of the portions 342A, 342B, 346A, 346B, by providing different wall thicknesses of the portions 342A, 342B, 346A, 346B, by forming the first portions 342A, 346A from a different material than the second portions 342B, 346B, by providing negative features defined in the first portions 342A, 346A or the second portions 342B, 346B, by providing the first portions 342A, 346A with other features or characteristics different than the second portions 342B, 346B such that the stiffness of each of the first portions 342A, 346A is different than the stiffness of the respective second portion 342B, 346B, or any combination of these or other attributes. Ultimately, the relative stiffness relationship between the first portions 342A, 346A and the second portions 342B, 346B may prevent or inhibit deformation of the first portions 342A, 346A or the second portions 342B, 346B during a rear-facing crash event, and may allow for controlled deformation of the other of the first portions 342A, 346A or the second portions 342B, 346B during such a rear-facing crash event. It will be appreciated that the first portions 342A, 346A and the second portions 342B, 346B may be configured to allow for such controlled deformation at or along any predetermined portion of the first portions 342A, 346A or the second portions 342B, 346B.

In other example embodiments in which the first side support 322A includes the two portions 342A, 342B attached at the joint 344 and the second side support 322B includes the two portions 346A, 346B attached at the joint 348, a stiffness of the first portion 342A may be equal to or substantially equal to a stiffness of the second portion 342B, and a stiffness of the first portion 346A may be equal to or substantially equal to a stiffness of the second portion 346B. In such embodiments, a stiffness of the joint 344 may be less that the stiffness of the portions 342A, 342B, and a stiffness of the joint 348 may be less that the stiffness of the portions 346A, 346B. In this manner, the relative stiffness relationship between the portions 342A, 342B and the joint 344 may prevent or inhibit deformation of the portions 342A, 342B during a rear-facing crash event, and may allow for controlled deformation of the joint 344 during such a rear-facing crash event. In a similar manner, the relative stiffness relationship between the portions 346A, 346B and the joint 348 may prevent or inhibit deformation of the portions 346A, 346B during a rear-facing crash event, and may allow for controlled deformation of the joint 348 during such a rear-facing crash event. Accordingly, the joints 344, 348 may controllably deform from their original shapes to deformed shapes during a rear-facing crash event to dissipate the crash energy over a longer period of time.

It will be appreciated that the size, shape, materials, and other characteristics of the overall support frame 306 as well as the above-described components and features thereof may be selected such that the support frame 306 is configured for optimizing energy management while satisfying the regulated excursion limits and crash test standards of a particular jurisdiction, which may vary in view of characteristics of the relevant population. In certain example embodiments, the support frame 306 may be configured to satisfy the regulated excursion limits and crash test standards of the United States of America, Europe or particular countries thereof, or any other country, region, state, or local jurisdiction.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A car seat comprising:
    a seat shell configured for supporting a child thereon;
    a base supporting the seat shell; and
    a support frame attached at least partially to at least one of the seat shell and the base and configured to manage energy during a crash event, the support frame comprising:
        a first frame portion comprising:
            a first side support and a second side support spaced apart from one another, each of the first side support and the second side support of the first frame portion comprising a first end defining an enclosed first cavity; and
        a second frame portion attached to the first frame portion, the second frame portion comprising:
            a first side support and a second side support spaced apart from one another, each of the first side support and the second side support of the second frame portion comprising a second end;
        wherein the second end of the first side support of the second frame portion is disposed within the enclosed first cavity of the first end of the first side support of the first frame portion and the second end of the second side support of the second frame portion is disposed within the first cavity of the first end of the second side support of the first frame portion, and
        wherein each of the first side support and the second side support of the second frame portion is configured to controllably deform at the second end of each of the first side support and the second side support of the second frame portion disposed within the first cavity.

2. The car seat of claim 1, wherein a stiffness of each of the first side support and the second side support of the second frame portion is less than a stiffness of each of the first side support and the second side support of the first frame portion.

3. The car seat of claim 2, wherein each of the first side support and the second side support of the second frame portion has a cross-sectional area that is less than a cross-sectional area of each of the first side support and the second side support of the first frame portion.

4. The car seat of claim 2, wherein each of the first side support and the second side support of the first frame portion has a cross-sectional area that is constant or substantially constant along a length thereof, and wherein each of the first side support and the second side support of the second frame portion has a cross-sectional area that is constant or substantially constant along a length thereof.

5. The car seat of claim 2, wherein each of the first side support and the second side support of the second frame portion has a wall thickness that is less than a wall thickness of each of the first side support and the second side support of the first frame portion.

6. The car seat of claim 2, wherein each of the first side support and the second side support of the second frame portion is formed of a material having a stiffness that is less than a stiffness of a material of each of the first side support and the second side support of the first frame portion.

7. The car seat of claim 2, wherein each of the first side support and the second side support of the second frame portion comprises one or more apertures, holes, slots, or indents defined therein and configured to decrease the stiffness of the first side support and the second side support of the second frame portion.

8. The car seat of claim 2, wherein each of the first side support and the second side support of the second frame portion is configured to controllably deform at a predetermined portion thereof.

9. The car seat of claim 1, wherein each of the first side support and the second side support of the first frame portion and the first side support and the second side support of the second frame portion is formed as a tubular member.

10. The car seat of claim 1, wherein the first side support of the second frame portion is integrally formed with the first side support of the first frame portion, and wherein the second side support of the second frame portion is integrally formed with the second side support of the first frame portion.

11. The car seat of claim 1, wherein the second frame portion is attached to the first frame portion at a first joint connection between the first side support of the second frame portion and the first side support of the first frame portion and at a second joint connection between the second side support of the second frame portion and the second side support of the first frame portion.

12. The car seat of claim 11, wherein the first joint connection is formed adjacent the second end of the first side support of the second frame portion and the first end of the first side support of the first frame portion, and wherein the second joint connection is formed adjacent the second end of the second side support of the second frame portion and the first end portion of the second side support of the first frame portion.

13. The car seat of claim 12, wherein the second end of the first side support of the second frame portion is attached to the first end of the first side support of the first frame portion at the first joint connection by one or more first fasteners, and wherein the second end of the second side support of the second frame portion is attached to the first end of the second side support of the first frame portion at the second joint connection by one or more second fasteners.

14. The car seat of claim 1, wherein the car seat is a convertible car seat configured for installing in a vehicle and securing to a vehicle seat in a forward-facing mode or a rear-facing mode, wherein the support frame is configured to maintain its original shape during a crash event when the car seat is installed in the forward-facing mode, and wherein a portion of the support frame is configured to controllably deform from its original shape to a deformed shape during a crash event when the car seat is installed in the rear-facing mode.

15. The car seat of claim 1, further comprising a forward-facing belt path configured for receiving a vehicle seat belt when the car seat is installed in a vehicle in a forward-facing mode, and a rear-facing belt path configured for receiving a vehicle seat belt when the car seat is installed in a vehicle in a rear-facing mode, wherein the support frame extends between the forward-facing belt path and the rear-facing belt path.

16. A car seat comprising:
a seat shell configured for supporting a child thereon;
a base supporting the seat shell; and
a support frame attached at least partially to at least one of the seat shell and the base and configured to manage energy during a crash event, the support frame comprising:
   a first frame portion comprising a first support comprising a first end; and
   a second frame portion attached to the first frame portion, the second frame portion comprising a first support comprising a second end;
   wherein the second end of the first support of the second frame portion is disposed within the first end of the first support of the first frame portion,
   wherein a stiffness of the first support of the second frame portion is different than a stiffness of the first support of the first frame portion, and
wherein the car seat is a convertible car seat configured for installing in a vehicle and securing to a vehicle seat in a forward-facing mode or a rear-facing mode, wherein the support frame is configured to maintain its original shape during a crash event when the car seat is installed in the forward-facing mode, and wherein a portion of the second frame portion of the support frame is configured to controllably deform from its original shape to a deformed shape during a crash event when the car seat is installed in the rear-facing mode.

17. A car seat comprising:
a seat shell configured for supporting a child thereon and comprising a seat back and a seat bottom;
a base supporting the seat shell; and
a support frame attached at least partially to at least one of the seat shell and the base and configured to manage energy during a crash event, the support frame comprising:
   a first frame portion comprising a first side support tube and a second side support tube spaced apart from one another and extending along the seat back of the seat shell, each of the first side support tube and the second side support tube of the first frame portion comprising a first end; and
   a second frame portion attached to the first frame portion, the second frame portion comprising a first side support tube and a second side support tube spaced apart from one another and extending along the seat bottom of the seat shell, each of the first side support tube and the second side support tube of the second frame portion comprising a second end;
   wherein the second end of the first side support tube of the second frame portion is positioned within the first end of the first side support tube of the first frame portion;
   wherein the second end of the second side support tube of the second frame portion is positioned within the first end of the second side support tube of the first frame portion; and
   wherein a stiffness of each of the first side support and the second side support of the second frame portion is different than a stiffness of each of the first side support and the second side support of the first frame portion.

18. The car seat of claim 1, wherein the first frame portion extends along a seat back of the seat shell and the second frame portion extends along a seat bottom of the seat shell.

* * * * *